United States Patent
Kawasaki et al.

(10) Patent No.: US 11,297,668 B2
(45) Date of Patent: Apr. 5, 2022

(54) TERMINAL APPARATUS, CORE NETWORK APPARATUS, AND COMMUNICATION CONTROL METHOD

(71) Applicants: SHARP KABUSHIKI KAISHA, Sakai (JP); FG Innovation Company Limited, Tuen Mun (HK)

(72) Inventors: Yudai Kawasaki, Sakai (JP); Masafumi Aramoto, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/484,424

(22) PCT Filed: Feb. 5, 2018

(86) PCT No.: PCT/JP2018/003779
§ 371 (c)(1),
(2) Date: Aug. 7, 2019

(87) PCT Pub. No.: WO2018/147219
PCT Pub. Date: Aug. 16, 2018

(65) Prior Publication Data
US 2019/0357287 A1 Nov. 21, 2019

(30) Foreign Application Priority Data
Feb. 7, 2017 (JP) .............................. JP2017-020138

(51) Int. Cl.
*H04W 76/15* (2018.01)
*H04W 76/20* (2018.01)
(Continued)

(52) U.S. Cl.
CPC ......... *H04W 76/15* (2018.02); *H04W 60/005* (2013.01); *H04W 64/00* (2013.01); *H04W 76/20* (2018.02); *H04W 80/10* (2013.01)

(58) Field of Classification Search
CPC ... H04W 60/005; H04W 64/00; H04W 76/15; H04W 76/20; H04W 80/10
(Continued)

(56) References Cited

U.S. PATENT DOCUMENTS

2018/0192390 A1* 7/2018 Li .......................... H04W 8/065
2018/0227743 A1* 8/2018 Faccin .................. H04W 48/17
(Continued)

FOREIGN PATENT DOCUMENTS

JP 2013-123267 A 6/2013

OTHER PUBLICATIONS

Study on Architecture for Next Generation System, 3GPP TR 23.799 V14.0.0 Dec. 2016.
(Continued)

*Primary Examiner* — Robert J Lopata
(74) *Attorney, Agent, or Firm* — ScienBiziP, P.C.

(57) ABSTRACT

Provided are: a terminal apparatus that can support establishment of sessions that connect to various DNs; a measure for communication control that is preferable for an apparatus on a network that can connect to the terminal apparatus; a measure for communication control for recognizing the types of DNs with which the sessions are connected; and a measure for communication control for achieving user data communication. With this configuration, the preferable measures for communication control and measures for achieving user data communication can be provided to a control apparatus and a terminal apparatus included in a communication system that supports the establishment of sessions that connect to various DNs.

16 Claims, 18 Drawing Sheets

(51) Int. Cl.
*H04W 60/00* (2009.01)
*H04W 64/00* (2009.01)
*H04W 80/10* (2009.01)

(58) Field of Classification Search
USPC .......................................................... 370/328
See application file for complete search history.

(56) References Cited

U.S. PATENT DOCUMENTS

2018/0227872 A1* 8/2018 Li ............................ H04W 8/02
2019/0182788 A1* 6/2019 Lee ........................ H04W 60/00
2019/0394651 A1* 12/2019 Wifvesson .......... H04L 63/0428
2020/0187277 A1* 6/2020 Lee ....................... H04W 80/10

OTHER PUBLICATIONS

System Architecture for the 5G System, 3GPP TS 23.501 V0.2.0 Jan. 2017.
Procedures for the 5G System, 3GPP TS 23.502 V0.1.1 Jan. 2017.
Orange, "Solution 5.1 update for SSC mode 3", S2-165873, SA WG2 Meeting #S2-117, Oct. 17-21, 2016.
ZTE Corporation, "Relationship between SSC mode and SM models", S2-165811, SA WG2 Meeting #117, Oct. 17-21, 2016.
Qualcomm Incorporated, "23.501: modified registration procedure for security", S2-170184, SA WG2 Meeting #118BIS, Jan. 16-20, 2017.
ZTE et al., "Proposed Network Slicing Update to 23.501 Clause 5.13", S2-170324, SA WG2 Meeting #118bis Jan. 16-20, 2017, Spokane, WA, USA.

* cited by examiner

FIG. 5B

| |
|---|
| IMSI |
| EMM State |
| GUTI |
| ME Identity |

FIG. 5C

| |
|---|
| APN in Use |
| Assigned Session Type |
| IP Address(es) |
| Default Bearer |

FIG. 5D

| |
|---|
| EPS Bearer ID |
| TI |
| TFT |

| |
|---|
| IMSI |
| MSISDN |
| MM State |
| GUTI |
| ME Identity |
| UE Radio Access Capability |
| UE Network Capability |
| MS Network Capability |
| Access Restriction |
| MME F-TEID |
| SGW F-TEID |
| eNB Address |
| MME UE S1AP ID |
| eNB UE S1AP ID |
| NR node Address |
| NR node ID |
| WAG Address |
| WAG ID |

| APN in Use |
|---|
| Assigned Session Type |
| IP Address(es) |
| PGW F-TEID |
| SCEF ID |
| Default bearer |

FIG. 9D

| EPS Bearer ID |
|---|
| TI |
| TFT |
| SGW F-TEID |
| PGW F-TEID |
| MME F-TEID |
| eNB address |
| NR node address |
| WAG address |
| eNB ID |
| NR node ID |
| WAG ID |

FIG. 11B

| |
|---|
| IMSI |
| ME Identity |
| MSISDN |
| MME F-TIED |
| SGW F-TIED |

FIG. 11C

| |
|---|
| APN in Use (Data Network Identifier) |
| Assigned Session Type (Assigned PDN Type) |
| SGW F-TEID |
| PGW F-TEID |
| Default Bearer |
| IP Address(es) |

FIG. 11D

| |
|---|
| EPS Bearer ID |
| TFT |
| PGW F-TEID |
| SGW F-TEID |
| eNB F-TEID |
| MME address |
| NR node address |
| WAG address |
| MME ID |
| NR node ID |
| WAG ID |

FIG. 12B

| IMSI |
| --- |
| ME Identity |
| MSISDN |
| RAT type |

FIG. 12C

| APN in Use |
| --- |

FIG. 12D

| Assigned Session Type |
| --- |
| IP Address(es) |
| SGW F-TEID |
| PGW F-TEID |
| Default Bearer |

FIG. 12E

| EPS Bearer ID |
| --- |
| TFT |
| SGW F-TEID |
| PGW F-TEID |

| User Identity |
| --- |
| APN in Use |
| EPS Bearer ID |
| Serving Node Information |

FIG. 13B

TERMINAL APPARATUS, CORE NETWORK APPARATUS, AND COMMUNICATION CONTROL METHOD

TECHNICAL FIELD

The present invention relates to a terminal apparatus, a core network apparatus, and a communication control method. This application claims priority based on JP 2017-20138 filed on Feb. 7, 2017 in Japan, the contents of which are incorporated herein in its entirety by reference.

BACKGROUND ART

The 3rd Generation Partnership Project (3GPP), which undertakes activities for standardizing recent mobile communication systems, discusses System Architecture Evolution (SAE), which is system architecture of the Long Term Evolution (LTE). The 3GPP is in the process of creating specifications for the Evolved Packet System (EPS), which realizes an all-Internet Protocol (IP) architecture. Note that a core network constituting the EPS is called an Evolved Packet Core (EPC).

In recent years, the 3GPP has been discussing next generation communication technology and system architecture for the 5th Generation (5G) mobile communication system, a next generation mobile communication system. In these discussions, Architecture and Security for Next Generation System (NextGen) have been discussed as next generation communication technologies. Furthermore, the 3GPP standardizes 5G System (5GS) as a system for realizing the 5G mobile communication system. In the 5GS, technical problems for connecting various terminals to a cellular network have been identified to standardize solutions.

For example, requirements include optimization and diversification of a communication procedure for supporting a continual mobile communication service depending on a terminal supporting various access networks, optimization of a system architecture in accordance with the optimization and diversification of the communication procedure, and the like.

CITATION LIST

Non Patent Literature

NPL 1: 3GPP TR 23.799; Technical Specification Group Services and System Aspects; Study on Architecture for Next Generation System; (Release 14)
NPL 2: 3GPP TS 23.501; Technical Specification Group Services and System Aspects; System Architecture for the 5G System; Stage 2; (Release 15)
NPL 3: 3GPP TS 23.502; Technical Specification Group Services and System Aspects; Procedures for the 5G System; Stage 2; (Release 15)

SUMMARY OF INVENTION

Technical Problem

In the 5GS, a common session management in the mobile communication service between a terminal and a network apparatus has been discussed. More specifically, it has been discussed that even in a case that the types of the Data Networks (DNs) to which sessions are established or the types of the access networks used to establish sessions differ between the sessions, a common protocol for session management is used to simplify the session management.

However, in a situation where sessions connecting to a wide variety of DNs are established, measures for recognizing the types of the DNs to which the sessions are connected, or measures for realizing user data communication, and the like, are not revealed.

The present invention has been made in view of the above described circumstances, and has an object to provide, in a situation where sessions connecting to a wide variety of DNs are established, communication control measures for recognizing the types of the DNs to which the sessions are connected, or communication control measures for realizing user data communication, and the like.

Solution to Problem

A terminal apparatus according to the present invention includes: a transmission and/or reception unit configured to perform a PDU session modification procedure with an apparatus included in a core network, and in the PDU session modification procedure, receive a PDU session modification request message from the apparatus included in the core network; and a controller configured to modify a connection destination of a PDU session to a data network A, based on completion of the PDU session modification procedure, in a case of accepting the PDU session modification request message, wherein the PDU session modification request message includes information A, the transmission and/or reception unit performs user data communication to be performed with the data network A, by using the information A, after completion of the PDU session modification procedure, the data network A is a data network for Mobile Edge Computing (MEC), and the information A is information that includes information for indicating the PDU session and/or information for indicating an IP address or a Traffic Flow Template (TFT) that can be used for the user data communication.

An apparatus included in a core network according to the present invention includes: a transmission and/or reception unit configured to perform a PDU session modification procedure with a terminal apparatus, and in the PDU session modification procedure, transmit a PDU session modification request message to the terminal apparatus; and a controller, wherein the PDU session modification request message includes information A, the information A is information that includes information for indicating a PDU session to modify a connection destination of the PDU session to a data network A, and/or information for indicating an IP address or a Traffic Flow Template (TFT) that can be used for user data communication between the data network A and the terminal apparatus by using the PDU session, and the data network A is a data network for Mobile Edge Computing (MEC).

A communication control method for a terminal apparatus according to the present invention includes the steps of: performing a PDU session modification procedure with an apparatus included in a core network; and in the PDU session modification procedure, receiving a PDU session modification request message from the apparatus included in the core network, modifying a connection destination of a PDU session to a data network A, based on completion of the PDU session modification procedure, in a case of accepting the PDU session modification request message, and performing user data communication to be performed with the data network A, by using information A, after completion of the PDU session modification procedure, wherein the PDU session modification request message includes the information A, the data network A is a data network for Mobile Edge Computing (MEC), and the information A is information that includes information for indicating the PDU session and/or information for indicating an IP address or a Traffic Flow Template (TFT) that can be used for the user data communication.

A communication control method for an apparatus included in a core network according to the present invention includes the steps of: performing a PDU session modification procedure with a terminal apparatus; and in the Pall session modification procedure, transmitting a PDU session modification request message to the terminal apparatus, wherein the PDU session modification request message includes information A, the information A is information that includes information for indicating a PDU session to modify a connection destination of the PDU session to a data network A, and/or information for indicating an IP address or a Traffic Flow Template (TFT) that can be used for user data communication between the data network A and the terminal apparatus using the PDU session, and the data network A is a data network for Mobile Edge Computing (MEC).

Advantageous Effects of Invention

According to the present invention, in a situation where sessions connecting to a wide variety of DNs are established, a terminal apparatus and each apparatus in a core network can recognize the types of DNs to which the sessions are connected, and further, user data communication with an intended DN can be realized.

BRIEF DESCRIPTION OF DRAWINGS

FIGS. 5B to 5D are diagrams illustrating a storage unit of the UE.

FIG. 8B is a diagram illustrating a storage unit of the MME/CPF/AMF.

FIGS. 9C and 9D are diagrams illustrating a storage unit of the MME/CPF/AMF.

FIGS. 11B to 11D are diagrams illustrating a storage unit of the SGW.

FIGS. 12B to 12E are diagrams illustrating a storage unit of the PGW/UPGW/SMF/UPF.

FIG. 13B is a diagram illustrating a storage unit of the SCEF.

DESCRIPTION OF EMBODIMENTS

Hereinafter, a preferred embodiment for carrying out the present invention will be described with reference to the drawings. Note that as an example, the present embodiment describes an embodiment of a mobile communication system to which the present invention is applied.

1. Embodiment 1.1. System Overview

Figure 1:
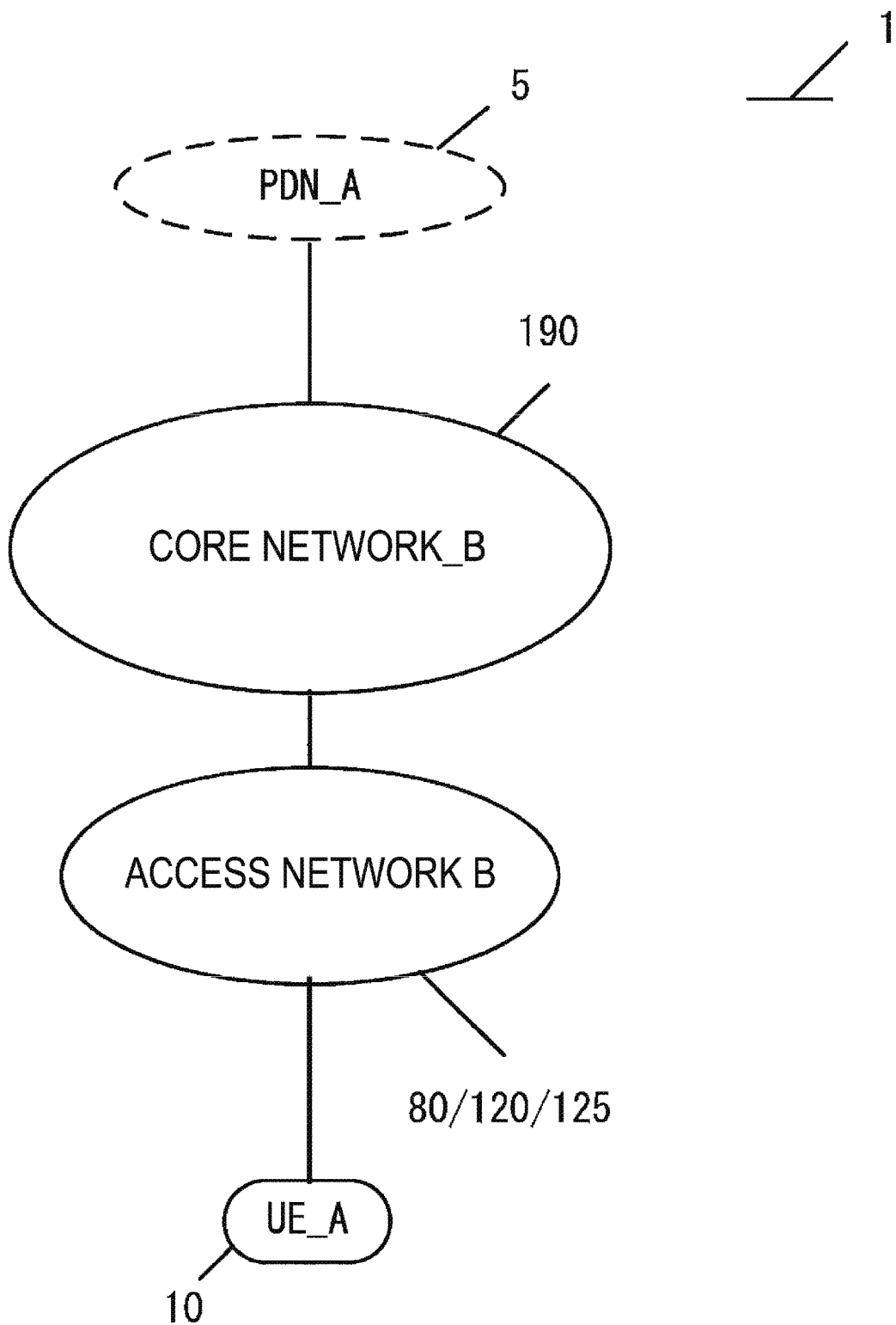
FIG. 1 is a diagram illustrating an overview of a mobile communication system.

FIG. 1 is a diagram illustrating an overview of a mobile communication system according to the present embodiment. As illustrated in FIG. 1, a mobile communication system 1 includes a mobile terminal apparatus UE_A 10, an access network_B, a core network_B 190, and a Packet Data Network (PDN)_A 5. Here, the UE_A 10 may be any wirelessly connectable terminal apparatus, and may be a User Equipment (UE), a Mobile Equipment (ME), a Mobile Station (MS), a Cellular Internet of Things (CIoT) terminal (CIoT UE), or the like. Furthermore, a core network may be the core network_B 190, and an access network may be the access network_B. Furthermore, the core network may be a core network apparatus. Alternatively, in the present embodiment, the core network apparatus may be each apparatus included in the core network_B 190 and/or an apparatus that performs some or all of the processing or functions of each apparatus. The access network_B may be a NextGen RAN_A 120 and/or an E-UTRAN_A 80 and/or a WLAN ANc 125.

The UE_A 10 is capable of connecting to the access network and/or the core network. Furthermore, the UE_A 10 is capable of connecting to the PDN_A 5 via the access network and/or the core network, and further transmits and/or receives user data to and/or from the PDN_A 5. Note that the user data may be data transmitted and/or received between the UE_A 10 and the PDN_A 5. Furthermore, transmission and/or reception (communication) of the user data may be performed using a Protocol Data Unit or Packet Data Unit (PDU) session, or using a Packet Data Network Connection (PDN connection). Furthermore, the communication of the user data may not be limited to Internet Protocol (IP) communication, but may be non-IP communication.

Here, the PDU session or the PDN connection (hereinafter, also referred to as the PDN connectivity) is connectivity established between the UE_A 10 and the PDN_A 5 for providing a PDU connectivity service to transmit and/or receive the user data between the UE_A 10 and the PDN_A 5, or the like. To be more specific, the PDU session or the PDN connection may be connectivity established between the UE_A 10 and an external gateway. Here, the external gateway may be an apparatus connecting the core network such as a Packet Data Network Gateway (PGW)_A 30, a User Plane Gateway (UPGW)_A 130, and a Service Capability Exposure Function (SCEF)_A 46 with the PDN_A 5.

The PDU session or the PDN connection may be a communication path established for transmitting and/or receiving the user data between the UE_A 10 and the core network and/or PDN_A 5, or a communication path for transmitting and/or receiving the PDU. Furthermore, the PDU session or the PDN connection may be a session established between the UE_A 10 and the core network and/or PDN_A 5, or may be a logical communication path including a transfer path such as one or multiple bearers and the like between apparatuses in the mobile communication system 1. More specifically, the PDU session may be a connection established by the UE_A 10 with the core network_B 190 and/or the external gateway, a connection established between the UE_A 10 and the UPGW_A 130 or a UPF_A 235, or a connection such as a Packet Data Network Connection (PDN connection).

Note that the PDN connection may be connectivity and/or a connection between the UE_A 10 and the PGW_A 30 via an evolved. Node B (eNB)_A 45 and/or a Serving Gateway (SGW)_A 35, or connectivity and/or a connection between the UE_A 10 and the SCEF_A 46 via the eNB_A 45 and/or a Mobility Management Entity (MME)_A 40. Furthermore, the PDU session may be connectivity and/or a connection between the UE_A 10 and the UPGW_A 130 or the UPF_A 235 via an NR node_A 122. Furthermore, the PDN connection may be identified by a PDN connection ID, and the PDU session may be identified by a PDU session ID. Furthermore, the PDN connection and the PDU session may be identified by an EPS bearer ID.

Note that the UE_A 10 can transmit and/or receive the user data to and/or from an apparatus located in the PDN_A 5 such as an application server by using the PDU session or the PDN connection. In other words, the PDU session or the PDN connection can transfer the user data transmitted and/or received between the UE_A 10 and the apparatus located in the PDN_A 5 such as an application server. Furthermore, the apparatuses (the UE_A 10, apparatuses in the access network, and/or apparatuses in the core network) may associate the PDU session or the PDN connection with one or multiple pieces of identification information for management. Note that these pieces of identification information may include at least one of an Access Point Name (APN), a Traffic Flow Template (TFT), a session type, application identification information, identification information of the PDN_A 5, Network Slice Instance (NSI) identification information, and Dedicated Core Network (DCN) identification information, and access network identification information, or may further include another information. Furthermore, in a case that multiple PDU sessions or PDN connections are established, respective pieces of identification information associated with the PDU sessions or the PDN connections may have the same content or different contents. Furthermore, the NSI identification information may be information for identifying NSI, and may be an NSI ID or a Slice Instance ID below.

IP communication is a communication of data by using IP, and is data communication achieved through transmitting and/or receiving an IP packet which is given an IP header. Note that a payload section constituting an IP packet may contain the user data transmitted and/or received by the UE_A 10. Non-IP communication is a communication not using IP, and is data communication achieved through transmitting and/or receiving data which is not given an IP header. For example, non-IP communication may be the data communication achieved through transmitting and/or receiving application data not given the IP packet, or may transmit and/or receive the user data transmitted and/or received by the UE_A 10 to which another header such as a MAC header and an Ethernet (trade name) frame header is given.

Furthermore, the PDN_A 5 may be a Data Network (DN) to provide a communication service to the UE_A 10. Note that the DN may be configured as a packet data service network, or configured for each service. Furthermore, the PDN_A 5 may include a connected communication terminal. Therefore, connecting with the PDN_A 5 may be connecting with the communication terminal or a server apparatus located in the PUN_A 5. Furthermore, the transmission and/or reception of the user data to and/or from the PDN_A 5 may be transmission and/or reception of the user data to and/or from the communication terminal or server apparatus located in the PDN_A 5. Note that the PDN_A 5 may be represented by the DN, or the DN may be represented by the PDN_A 5.

Furthermore, the access network is a radio network connecting with the UE_A 10 and/or the core network. The access network may be a 3GPP access network, or a non-3GPP access network. Note that the 3GPP access network may be an Evolved Universal Terrestrial Radio Access Network (E-UTRAN)_A 80, and a Next Generation Radio Access Network (NextGen RAN)_A 120, and the non-3GPP access network may be an WLAN ANc 125. Note that the UE_A 10 may connect with the access network in order to connect to the core network, or may connect to the core network via the access network.

Furthermore, the core network is an IP mobile communication network run by a Mobile Network Operator to which the access network and/or the PDN_A 5 connects. The core network may be a core network for the mobile network operator that runs and manages the mobile communication system 1, or may be a core network for a virtual mobile network operator such as a Mobile Virtual Network Operator (MVNO) or a Mobile Virtual Network Enabler (MVNE), or a virtual mobile communication service provider. Note that the core network_B 190 may be an Evolved Packet Core (EPC) constituting an Evolved Packet System (EPS), may be a Next Generation (NextGen) Core (NGC) constituting a Next Generation System (NextGen System (NGS)), or may be a 5G Core Network (5GC) constituting a 5G Core Network (5GC). Furthermore, the core network_B 190 may be a core network for a system providing the 5G communication service. Note that the core network_B 190 is not limited to that above described, but may be a network for providing a mobile communication service.

Figure 3A:
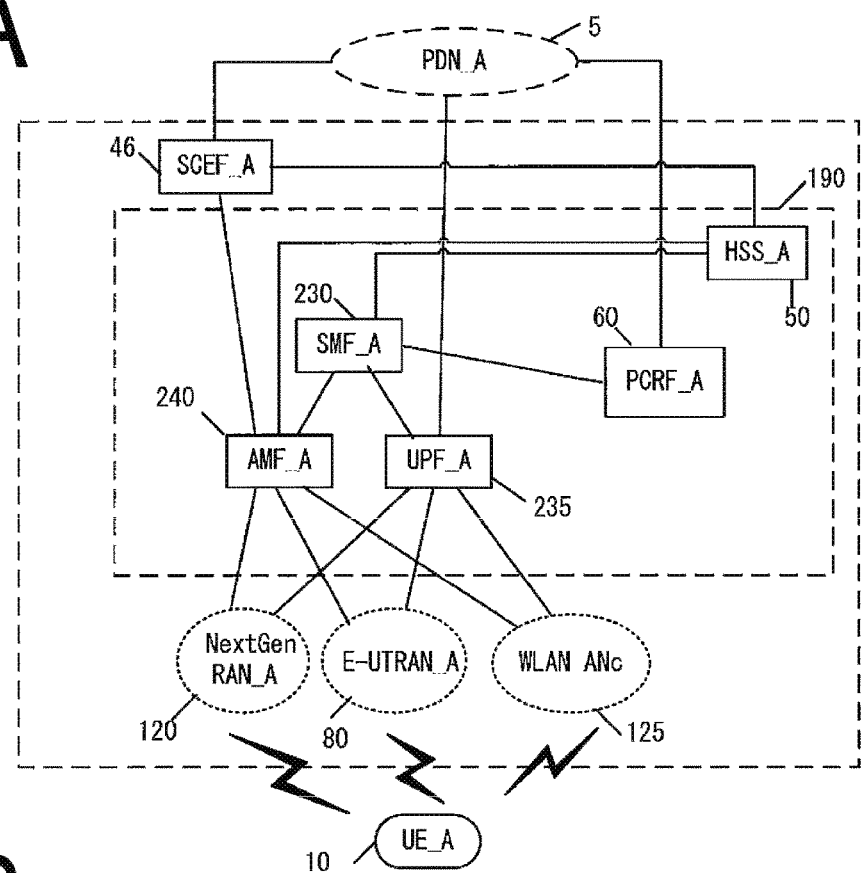
FIGS. 3A and 3B are diagrams illustrating an example of a configuration or the like of a core network and an access network in the mobile communication system.
Figure 3B:
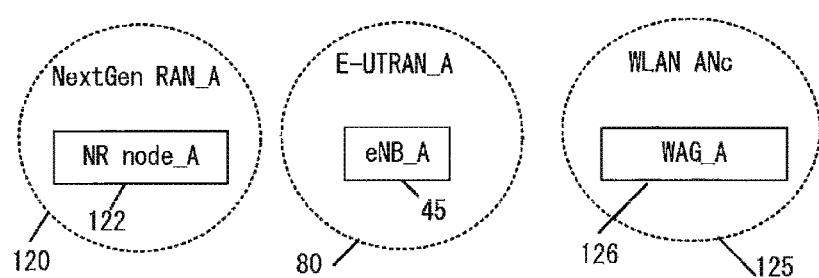

Next, an example of a configuration of the core network_B 190 will be described. An example of a configuration of the core network_B 190 will be described. FIGS. 3A and 3B illustrate an example of the configuration of the core network_B 190. The core network_B 190 in FIG. 3A includes an HSS_A 50, a PCRF_A 60, a Session Management Function (SMF)_A 230, the User Plane Function (UPI)_A 235, an Access and Mobility Management Function (AMF)_A 240, and the SCEF_A 46.

Note that the SMF_A 230 and/or the AMF_A 240 may be a Control Plane Function (CPF)_A 140, and the UPF_A 235 may be a User Plane Gateway (PGW)_A 130. Accordingly, the SMF_A 230 and/or the AMF_A 240 may be expressed as the CPF_A 140, and the CPF_A 140 may be expressed as the SMF_A 230 and/or the AMF_A 240. Furthermore, the UPF_A 235 may be expressed as the UPGW_A 130, and the UPGW_A 130 may be expressed as the UPF_A 235. The core network_B 190 is capable of connecting to multiple radio access networks (E-UTRAN_A 80, NextGen RAN_A 120, and WLAN ANc 125). Such a radio access network may be configured to connect to multiple different access networks, or may be configured to connect to either one of the access networks. Moreover, the UE_A 10 is capable of wirelessly connecting to the radio access network.

Furthermore, the E-UTRAN_A 80 and the NextGen RAN_A 120 can be configured as access networks connectable in a 3GPP access system. The WLAN access network c (WLAN ANc 125) that connects to the CPF_A 140 or the AMF_A 240 and the UPGW_A 130 or the UPF_A 235 can be configured as an access network connectable in the WLAN access system. Each apparatus will be described briefly hereinafter.

The UPGW_A 130 or the UPF_A 235 is an apparatus connected to the PDN_A 5 and the CPF_A 140, or the SMF_A 230, the E-UTRAN 80, the NextGen RAN_A 120, and the WLAN ANc 125, and serves as a relay device configured to transfer the user data by functioning as a gateway between the PDN_A 5 and/or DN and the core network_B 190. Note that the UPGW_A 130 or the UPF_A 235 may serve as a gateway for IP communication and/or non-IP communication. The UPGW_A 130 or the UPF_A 235 may have a function to transfer IP communication, or may have a function to convert between non-IP communication and IP communication. Note that multiple gateways like this may be located in the core network_B 190. Furthermore, the multiple gateways located may serve as gateways connecting the core network_B 190 with a single DN. Note that the UPGW_A 130 or the UPF_A 235 may have connectivity with another NF to connect to each apparatus via another NF. Note that the UPGW_A 130 or UPF_A 235 may be the SGW_A 35 and/or the PGW_A 30.

The PGW_A 30 is connected to the PDN_A 5, the SGW_A 35, and the PCRF_A 60, and serves as a relay device configured to transfer user data by functioning as a gateway between the PDN_A 5 and/or DN and the core network_B 190. Note that the PGW_A 30 may serve as a gateway for IP communication and/or non-IP communication.

The PGW_A 30 may have a function to transfer IP communication, or may have a function to convert between non-IP communication and IP communication. Note that multiple gateways like this may be located in the core network_B 190. Furthermore, the multiple gateways located may serve as gateways connecting the core network_B 190 with a single DN.

Note that a User Plane (U-Plane) may be a communication path for transmitting and/or receiving the user data, and may be configured to include multiple bearers. Furthermore, a Control Plane (C-Plane) may be a communication path for transmitting and/or receiving a control message, and may be configured with multiple bearers.

The PGW_A 30 may be connected to an UP function and a Policy function, or may be connected to the UE_A 10 via the U-Plane. Moreover, the PGW_A 30 may be configured integrally with the UPGW_A 130 or the UPF_A 235.

The SGW_A 35 is connected to the PGW_A 30, the MME_A 40, and the E-UTRAN_A 80, and serves as a relay device configured to transfer user data by functioning as a gateway between the core network_B 190 and the 3GPP access network (the E-UTRAN_A 80, the NextGen RAN_A 120).

The SGW_A 35 may be an UP function which has a contact with the access network and transfers the user data, or may be the User Plane Gateway (UPGW)_A 130 that is a gateway for transferring the user data between the access network and the core network.

The CPF_A 140 is an apparatus connected to the UPGW_A 130 or the UPF_A 235, the E-UTRAN_A 80, the NextGen RAN_A 120, the WLAN ANc 125, the HSS_A 50, and the SCEF_A 46. The CPF_A 140 may be an NF serving the mobility management of the UE_A 10 or the like, an NF serving the session management of the PDU session, or an NF managing one or multiple NSIs. The CPF_A 140 may be an NE serving one or multiple of these roles. Note that the NF may be one or multiple apparatuses located in the core network_B 190, a Control Plane Function or Control Plane Network Function (CP function) for the control information and/or control message, or a common CP function (Common Control Plane Network Function (Common CPNF), CCNF) shared between multiple NSIs. Note that the CPF_A 140 may have connectivity with another NF to connect to each apparatus via another NF. Note that CPF_A 140 may be the MME_A 40 or an NF with AMF_A 240 and SMF_A 230 functions.

The AMF_A 240 is an apparatus connected to the SMF_A 230, the E-UTRAN_A 80, the NextGen RAN_A 120, the WLAN ANc 125, the HSS_A 50, and the SCEF_A 46. The AMF_A 240 may be an NF serving the mobility management of the UE_A 10 or the like, or an NE managing one or multiple NSIs. The AMF_A 240 may be an NF serving one or multiple of these roles. Note that the NF may be one or multiple apparatuses located in the core network_B 190, a Control Plane Function or Control Plane Network Function (CP function) for the control information and/or control message, or a common CP function (Common Control Plane Network Function (Common CPNF), CCNF) shared between multiple NSIs. Note that the AMF_A 240 may have connectivity with another NF to connect to each apparatus via another NF. Note that the AMF_A 240 may be an NE with some functions of the functions of the CPF_A 140.

Furthermore, the SMF_A 230 is an apparatus connected to the AMF_A 240, the UPF_A 235, the HSS_A 50, and the PCRF_A 60. The SMF_A 230 may be an NF serving session management, such as a PDU session. Note that the NF may be one or multiple apparatuses located in the core network_B 190, a Control Plane Function or Control Plane Network Function (CP function) for the control information and/or control message, or a common CP function (Common Control Plane Network Function (Common CPNF), CCNF) shared between multiple NSIs. Note that the SMF_A 230 may have connectivity with another NF to connect to each apparatus via another NF. Note that the SMF_A 230 may be an NF with some functions of the functions of the CPF_A 140.

The MME_A 40 is connected to the SGW_A 35, the access network, the HSS_A 50, and the SCEF_A 46, and is a control apparatus that performs location information management including mobility management and access control for the UE_A 10 via the access network. The MME_A 40 may further include a function as a session management apparatus to manage a session established by the UE_A 10.

Multiple control apparatuses like this may be located in the core network_B 190, and, for example, a location management device different from the MME_A 40 may be configured. The location management device different from the MME_A 40 may be connected with the SGW_A 35, the access network, the SCEF_A 46, and the HSS_A 50, similar to the MME_A 40.

Furthermore, in a case that multiple MMEs are included in the core network_B 190, the MMEs may be connected to each other. With this configuration, the context of the UE_A 10 may be transmitted and/or received between the MMEs. In this way, the MME_A 40 is a management apparatus to transmit and/or receive the control information concerning the mobility management and session management to and/or from the UE_A 10, and in other words, may be a control apparatus for a Control Plane (C-Plane; CP).

The example is described in which the MME_A 40 is configured to ire included in the core network_B 190, but the MME_A 40 may be a management apparatus configured in one or multiple core networks, DCNs, or NSIs, or may be a management apparatus connected to one or multiple core networks, DCNs, or NSIs, Here, multiple DCNs or NSIs may be run by a single network operator, or different network operators respectively.

The MME_A 40 may be a relay device configured to transfer user data as a gateway between the core network_B 190 and the access network. Note that the user data transmitted and/or received by MME_A 40 as a gateway may be small data.

The MME_A 40 may be an NF serving the mobility management of the UE_A 10 or the like, an NE serving the session management of the PDU session or the like, or an NF managing one or multiple NSIs. The MME_A 40 may be an NF serving one or multiple of these. Note that the NF may be one or multiple apparatuses located in the core network_B 190, a CP function (hereinafter, also referred to as a Control Plane Function (CPF) or a Control Plane Network Function) for the control information and/or control message, or a common CP function shared between multiple NSIs.

Here, the NF is a processing function configured in a network. Specifically, the NF may be a function apparatus such as the MME, the SGW, the PGW, the CPF, and the UPGW, or may be a function such as Mobility Management (MM) and Session Management (SM), or capability information. The NF may be a function apparatus to realize a single function, or a function apparatus to realize multiple functions. For example, an NF to realize the MM function and an NF to realize the SM function may be separately present, or an NF to realize both the MM function and the SM function may be present.

The SCEF_A 46 is connected to the PDN_A 5 and the CPF_A 140, or AMF_A 240 or the MME_A 40 and the HSS_A 50, and is a relay device configured to transfer the user data as a gateway interfacing the PDN_A 5 and/or the DN and the core network_B 190. Note that the SCEF_A 46 may serve as a gateway for non-IP communication. The SCEF_A 46 may have a function to convert between non-IP communication and IP communication. Multiple gateways like this may be located in the core network_B 190. Furthermore, multiple gateways connecting the core network_B 190 with a single PDN_A 5 and/or DN may be also located. Note that the SCEF_A 46 may be configured outside or inside the core network.

The HSS_A 50 is connected to the MME_A 40 or the AMF_A 240 or the SMF_A 230 and the SCEF_A 46, and is a managing node configured to manage subscriber information. The subscriber information of the HSS_A 50 is referred to during the access control by the MME_A 40, for example. Moreover, the HSS_A 50 may be connected to the location management device different from the MME_A 40. For example, the HSS_A 50 may be connected to the CPF_A 140 or the AMF_A 240 or the SMF_A 230.

The PCRF_A 60 is connected to the UPGW_A 130 or the SMF_A 230 or the PGW_A 30 and the PDN_A 5, and is configured to perform QoS management on data delivery. For example, the PCRF_A 60 manages QoS of a communication path between the UE_A 10 and the PDN_A 5. The PCRF_A 60 may be an apparatus to create and/or manage a Policy and Charging Control (PCC) rule used by each apparatus for transmitting and/or receiving the user data and/or a routing rule.

The PCRF_A 60 may be a Policy function to create and/or manage a policy. To be more specific, the PCRF_A 60 may be connected to the UP function.

As illustrated in FIG. 3B, each radio access network includes apparatuses to which the UE_A 10 is actually connected (such as a base station apparatus and an access point apparatus), and the like. The apparatuses used in these connections can be thought as apparatuses adapted to the radio access networks.

In the present embodiment, the E-UTRAN_A 80 is an access network for the Long Term Evolution (LTE) and is configured to include the eNB_A 45. The eNB_A 45 is a radio base station to which the UE_A 10 connects through an Evolved Universal Terrestrial Radio Access (E-UTRA), and the E-UTRAN_A 80 may be configured to include one or multiple eNBs_A 45. Furthermore, the multiple eNBs may be connected to each other.

The NextGen RAN_A 120 is a 5G access network, and is configured to include a New Radio Access Technology node (NR node)_A 122. The NR node_A 122 is a radio base station to which the UE_A 10 connects through the Next Generation Radio Access (NextGen RA), and the NextGen RAN_A 120 may be configured to include one or multiple NR nodes_A 122. Note that in a case that the NextGen RAN_A 120 includes multiple NR node_A 122, the NextGen RAN_A 120 may include an NR node_A 122 and an NR node_B 123. In this case, the NR node_B 123 may be the same configuration as the NR node_A 122.

The NextGen RAN_A 120 may be an access network configured to include the E-UTRA and/or the NextGen RA. In other words, the NextGen RAN_A 120 may include the eNB_A 45, the NR node_A 122, or both the eNB_A 45 and the NR node_A 122. In this case, the eNB_A 45 and the NR node_A 122 may be the same apparatuses. Therefore, the NR node_A 122 can be substituted with the eNB_A 45.

Note that the NextGen RAN_A 120 may be a 5G Radio Access Network (5G-RAN) or may be a 5G Access Network (5G-AN). In other words, the NextGen RAN_A 120 may be expressed as the 5G-RAN and/or the 5G-AN, or the 5G-RAN and/or the 5GN-AN may be expressed as the NextGen RAN_A 120.

The WLAN ANc 125 is a radio LAN access network, and is configured to include a WAG_A 126. The WLAN Access Gateway (WAG)_A 126 is a radio base station to which the UE_A 10 connects through a radio LAN access, and the WLAN ANc 125 may be configured to include one or multiple WAGs_A 126. The WAG_A 126 may serve as a gateway between the core network_B 190 and the WLAN ANc 125. The WAG_A 126 may have a function unit for the radio base station and a function unit for the gateway which are configured as different apparatuses.

Note that herein, the UE_A 10 being connected to each radio access network refers to that the UE_A 10 is connected to a base station apparatus, an access point, or the like included in the radio access network, and data, signals, and the like transmitted and/or received also pass through the base station apparatus, the access point, or the like. Note that the control message transmitted and/or received between the UE_A 10 and the core network_B 190 may be the same control message independently from a type of the access network. Therefore, the UE_A 10 and the core network_B 190 transmitting and/or receiving a message to and/or from each other via the NR node_A 122 may mean the same thing as that the UE_A 10 and the core network_B 190 transmit and/or receive a message to and/or from each other via the eNB_A 45 and/or WAG_A 126.

1.2. Apparatus Configuration

First, a description is given of the identification information stored in each apparatus. International Mobile Subscriber Identity (IMSI) is permanent identification information of a subscriber (user), and is identification information assigned to a user using the UE. The IMSI stored by the UE_A 10 and the MME_A 40/CPF_A 140/AMF_A 2400 and the SGW_A 35 may be the same as the IMSI stored by the HSS_A 50.

EMM State/MM State indicates a Mobility management mode of the UE_A 10 or the MME_A 40/CPF_A 140/AMF_A 240. For example, the EMM State/MM State may be EMM-REGISTERED mode (registered mode) in which the UE_A 10 is registered to the network and/or EMM-DEREGISTERED mode (deregistered mode) in which the UE_A 10 is not registered to the network. The EMM State/MM State may be ECM-CONNECTED mode in which a connection is held between the UE_A 10 and the core network and/or ECM-IDLE mode in which the connection is released. Note that the EMM State/MM State may be information capable of distinguishing a mode that the UE_A 10 is registered in the EPC from a mode that the UE_A 10 is registered in the NGC or the 5GC.

Globally Unique Temporary Identity (GUTI) is temporary identification information about the UE_A 10. The GUTI includes identification information on the MME_A 40/CPF_A 140/AMF_A 240 (Globally Unique MME Identifier (GUMMEI)) and identification information on the UE_A 10 in a specific MME_A 40/CPF_A 140/AMF_A 240 (M-Temporary Mobile Subscriber Identity (M-TMSI)). ME Identity is an ID of the UE_A 10 or ME, and may be International Mobile Equipment Identity (IMEI) or IMEI Software Version (IMEISV), for example. MSISDN represents a basic phone number of the UE_A 10. The MSISDN stored by the MME_A 40/CPF_A 140/AMF_A 240 may be information indicated by a storage unit of the HSS_A 50. Note that the GUTI may include information identifying the CPF_140.

MME F-TEID is information identifying the MME_A 40/CPF_A 140/AMF_A 240. The MME F-TEID may include an IP address of the MME_A 40/CPF_A 140/AMF_A 240, a Tunnel Endpoint Identifier (TEID) of the MME_A 40/CPF_A 140/AMF_A 240, or both of them. The IP address of the MME_A 40/CPF_A 140/AMF_A 240 and the TEID of the MME_A 40/CPF_A 140/AMF_A 240 may be stored independently. The MME F-TEID may be identification information for user data, or identification information for control information.

SGW F-TEID is information identifying the SGW_A 35. The SGW F-TEID may include an IP address of the SGW_A 35, a TEID of the SGW_A 35, or both of them. The IP address of the SGW_A 35 and the TEID of the SGW_A 35 may be stored independently from each other. The SGW F-TEID may be identification information for user data, or identification information for control information.

PGW F-TEID is information identifying the PGW_A 30/UPGW_A 130/SMF_A 230/UPF_A 235. The PGW F-TEID may include an IP address of the PGW_A 30/UPGW_A 130/SMF_A 230/UPF_A 235, a TEID of the PGW_A 30/UPGW_A 130/SMF_A 230/UPF_A 235, or both of them. The IP address of the PGW_A 30/UPGW_A 130/SMF_A 230/UPF_A 235 and the TEID of the PGW_A 30/UPGW_A 130/SMF_A 230/UPF_A 235 may be stored independently from each other. The PGW F-TEID may be identification information for user data, or identification information for control information.

eNB F-TEID is information identifying the eNB_A 45. The eNB F-TEID may include an IP address of the eNB_A 45, a TEID of the eNB_A 45, or both of them. The IP address of the eNB_A 45 and the TEID of the SGW_A 35 may be stored independently from each other. The eNB F-TEID may be identification information for user data, or identification information for control information.

The APN may be identification information identifying the core network and an external network such as the DN. The APN can be used also as information to select a gateway such as the PGW_A 30/UPGW_A 130/UPF_A 235 for connecting to the core networkA_90. Note that the APN may be Data Network Name (DNN). Therefore, the APN may be expressed as the DNN, and the DNN may be expressed as the APN.

Note that the APN may be identification information identifying such a gateway, or identification information identifying an external network such as the DN. Note that in a case that multiple gateways connecting the core network to the DN are located, multiple gateways selectable according to the APN may be provided. Moreover, one gateway may be selected from among such multiple gateways by another scheme using identification information other than the APN.

UE Radio Access Capability is identification information indicating a radio access capability of the UE_A 10. UE Network Capability includes an algorithm of security supported by the UE_A 10 and a key derivative function. MS Network Capability is information including one or multiple types of information necessary for the SGSN_A 42 to the UE_A 10 having the GERAN_A 25 and/or UTRAN_A 20 function. Access Restriction is registration information for access restriction. eNB Address is an IP address of the eNB_A 45. MME UE S1AP ID is information identifying the UE_A 10 in the MME_A 40/CPF_A 140/AMF_A 240. eNB UE S1AP ID is information identifying the UE_A 10 in the eNB_A 45.

APN in Use is an APN recently utilized. The APN in Use may be Data Network Identifier. This APN may be configured to include identification information about the network and identification information about a default operator. Furthermore, the APN in Use may be information identifying a DN with which the PDU session is established.

Assigned Session Type is information indicating a PDU session type. The Assigned Session Type may be Assigned PDN Type. The PDU session type may be an IP, or a non-IP. In a case that the PDU session type is an IP, information indicating a PDN type assigned by the network may be further included. Note that the Assigned Session Type may be IPv4, IPv6, or IPv4v6.

Unless otherwise specifically described, the IP Address refers to the IP address assigned to the UE. The IP address may be an IPv4 address, an IPv6 address, or an IPv6 prefix. Note that in a case that the Assigned Session Type indicates a non-IP, an element of the IP Address may not be contained.

The DN ID is identification information identifying the core network_B 190 and an external network such as a DN. The DN ID can be used further as information for selecting a gateway such as the UPGW_A 130 or the PF_A 235 connecting to the core network_B 190.

Note that the DN ID may be identification information identifying such a gateway, or identification information identifying an external network such as the DN. Note that in a case that multiple gateways connecting the core network_B 190 to the DN are located, multiple gateways may be selectable according to the DN ID. Moreover, one gateway may be selected from among such multiple gateways by another scheme using identification information other than the DN ID.

The DN ID may be information equivalent to the APN, or different from the APN. Note that in a case that the DN ID is the information different from the APN, each apparatus may manage information indicating a correspondence relationship between the DN ID and the APN, perform a procedure to inquire the APN by using the DN ID, or perform a procedure to inquire the DN ID by using the APN.

SCEF ID is an IP address of the SCEF_A 46 used in the PDU session. Default Bearer is EPS bearer identification information, which is information acquired and/or generated in establishing a PDU session, for identifying a default bearer associated with the PDU session.

EPS Bearer ID is identification information on the EPS bearer. The EPS Bearer ID may be identification information identifying Signalling Radio Bearer (SRB) and/or Controlplane Radio bearer (CRB), or identification information identifying Data Radio Bearer (DRB). Transaction Identifier (TI) is identification information identifying a bidirectional message flow (Transaction). Note that the EPS Bearer ID may be EPS bearer identification information identifying a dedicated bearer. Therefore, the EPS bearer ID may be identification information identifying the EPS hearer different from the default bearer. The TFT indicates all the packet filters associated with the EPS bearer. The TFT is information identifying some pieces of the transmitted and/or received user data, and thus, the UE_A 10 uses the EPS bearer associated with the TFT to transmit and/or receive the user data identified by the TFT. Further in other words, the UE_A 10 uses Radio Bearer (RB) associated with the TFT to transmit and/or receive the user data identified by the TFT. The TFT may associate the user data such as the transmitted and/or received application data with a proper transfer path, and may be identification information identifying the application data. The UE_A 10 may use the default bearer to transmit and/or receive the user data which cannot be identified by the ITT. The UE_A 10 may store in advance the TFT associated with the default hearer.

The Default Bearer is the EPS hearer identification information identifying a default bearer associated with a PDU session. Note that the EPS bearer may be a logical communication path established between UE_A 10 and the PGW_A 30/UPGW_A 130/UPF_A 235, or a communication path configuring a PDN connection/PDU session. The EPS bearer may be a default bearer, or a dedicated bearer. The EPS bearer may be configured to include an RB established between the UE_A 10 and the base station and/or access point in the access network. Furthermore, the RB and the EPS bearer may be associated with each other on a one-to-one basis. Therefore, identification information on the RB may be associated with the identification information on the EPS bearer on a one-to-one basis, or may be the same identification information as on the EPS bearer. Note that the RB may be an SRB and/or CRB, or a DRB. The Default Bearer may be information that the UE_A 10 and/or SGW_A 35 and/or PGW_A 30/UPGW_A 130/SMF_A 230/UPF_A 235 acquire from the core network in establishing a PDU session. Note that the default bearer is an EPS bearer established initially during the PDN connection/PDU session, and is an EPS hearer only one of which can be established in one PDN connection/PDU session. The default bearer may be an EPS bearer that can be used to communicate user data not associated with the TFT. The dedicated bearer is an EPS bearer established after a default bearer is established in the PDN connection/PDU session, and an EPS bearer multiple of which can be established in one PDN connection/PDU session. The dedicated bearer is an EPS bearer that can be used to communicate user data associated with TFT.

User Identity is information identifying a subscriber. The User identity may be an IMSI, or a MSISDN. The User Identity may also be identification information other than an IMSI or MSISDN. Serving Node Information is information identifying the MME_A 40/CPF_A 140/AMF_A 240 used in a PDU session, and may be an IP address of the MME_A 40/CPF_A 140/AMF_A 240.

eNB Address is an IP address of the eNB_A 45. eNB ID is identification information identifying the UE in the eNB_A 45. MME Address is an IP address of the MME_A 40/CPF_A 140/AMF_A 240. MME ID is information identifying the MME_A 40/CPF_A 140/AMF_A 240. NR node Address is an IP address of the NR node_A 122. NR node ID is information identifying the NR node_A 122. WAG Address is an IP address of the WAG_A 126. WAG ID is information identifying the WAG_A 126.

The configuration of each apparatus will be described below. Note that some or all of apparatuses described below or functions of units in the apparatuses may operate on physical hardware, or logical hardware which is virtually configured on general-purpose hardware.

1.2.1. Configuration of UE

Figure 4A:
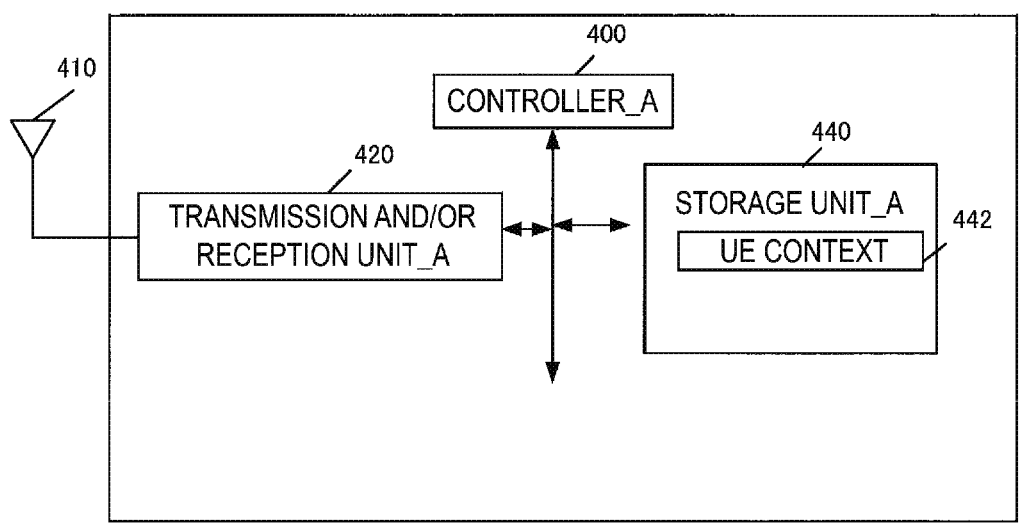
FIG. 4A is a diagram illustrating an apparatus configuration of a UE.

FIG. 4A illustrates an apparatus configuration of the UE_A 10. As illustrated in the drawing, the UE_A 10 includes a transmission and/or reception unit_A 420, a controller_A 400, and a storage unit_A 440. The transmission and/or reception unit_A 420 and the storage unit_A 440 are connected to the controller_A 400 via a bus. The controller_A 400 is a function unit to control the UE_A 10. The controller_A 400 implements various processes by reading out various programs stored in the storage unit_A 440 and performing the programs.

The transmission and/or reception unit_A 420 is a function unit through which the UE_A 10 connects to the base station in the access network and/or the access point to connect to the access network. An external antenna_A 410 is connected to the transmission and/or reception unit_A 420. In other words, the transmission and/or reception unit_A 420 is a function unit through which the UE_A 10 connects to the base station in the access network and/or the access point. The transmission and/or reception unit_A 420 is a transmitting and/or receiving function unit through which the UE_A 10 transmits and/or receives the user data and/or control information to and/or from the base station in the access network and/or the access point.

The storage unit_A 440 is a function unit configured to store programs, data, and the like necessary for each operation of the UE_A 10. The storage unit_A 440 includes, for example, a semiconductor memory, a Hard Disk Drive (HDD), or the like. The storage unit_A 440 may store at least identification information and/or control information and/or a flag and/or a parameter included in a control message which is transmitted and/or received in a communication procedure described later. As illustrated in the drawing, the storage unit_A 440 stores a UE context 442. Hereinafter, information elements stored in the storage unit_A 440 will be described. Note that the UE context 442 may include a UE context used to connect to the core network_B 190 and a UE context used to connect to the core network_B 190. The LIE context used to connect to core network_B 190 and the UE context used to connect to the core network_B 190 may be stored together or separately.

First, FIG. 5B illustrates information elements included in the UE context stored for each UE. As illustrated in the drawing, the UE context stored for each UE includes IMSI, EMM State, GUTI, and ME Identity. Next, FIG. 5C illustrates the UE context for each PDU session or PDN connection stored for each PDU session or PDN connection. As illustrated in the drawing, the UE context for each PDU session includes APN in Use, Assigned Session Type, IP Address(s), and Default Bearer.

FIG. 5D illustrates the UE context for each bearer stored in the storage unit of the UE. As illustrated in the drawing, the UE context for each bearer includes EPS Bearer ID, TI, and TFT.

1.2.2. Configuration of eNB/NR node/WAG

Figure 6A:
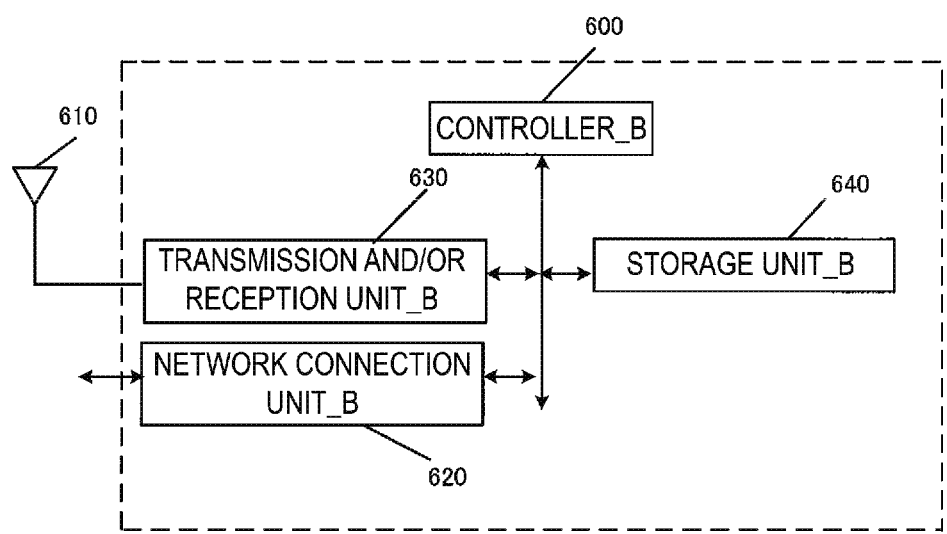
FIG. 6A is a diagram illustrating an apparatus configuration of an eNB/NR node/WAG.

A configuration of the eNB_A 45, the NR node_A 122, and the WAG_A 126 will be described below. FIG. 6A illustrates an apparatus configuration of the eNB_A 45, the NR node_A 122, and the WAG_A 126. As illustrated in the drawing, the eNB_A 45, the NR node_A 122, and the WAG_A 126 include a network connection unit_B 620, a transmission and/or reception unit_B 630, a controller_B 600, and a storage unit_B 640. The network connection unit_B 620, the transmission and/or reception unit_B 630, and the storage unit_B 640 are connected to the controller_B 600 via a bus.

The controller_B 600 is a function unit for controlling the eNB_A 45. The controller_B 600 implements various processes by reading out various programs stored in the storage unit_B 640 and performing the programs.

The network connection unit_B 620 is a function unit through which the eNB_A 45, the NR node_A 122, and the WAG_A 126 connect to the MME_A 40 and/or SGW_A 35. The network connection unit_B 620 is a transmission and/or reception unit through which the eNB_A 45, the NR node_A 122, and the WAG_A 126 transmit and/or receive the user data and/or control information to and/or from the MME_A 40 and/or the SGW_A 35.

The transmission and/or reception unit_B 630 is a function unit through which the eNB_A 45, the NR node_A 122, and the WAG_A 126 connect to the UE_A 10. Furthermore, the transmission and/or reception unit_B 630 is a transmitting and/or receiving function unit for transmitting and/or receiving the user data and/or control information to and/or from the UE_A 10. Furthermore, an external antenna_B 610 is connected to the transmission and/or reception unit_B 630.

The storage unit_B 640 is a function unit for storing programs, data, and the like necessary for each operation of the eNB_A 45, the NR node_A 122, and the WAG_A 126. The storage unit_B 640 includes, for example, a semiconductor memory, a HDD, or the like. The storage unit_B 640 may store at least identification information and/or control information and/or a flag and/or a parameter included in a control message which is transmitted and/or received in a communication procedure described later. The storage unit_B 640 may store these pieces of information as the contexts for each UE_A 10.

1.2.3. Configuration of MME/CPF/AMF

Figure 7A:
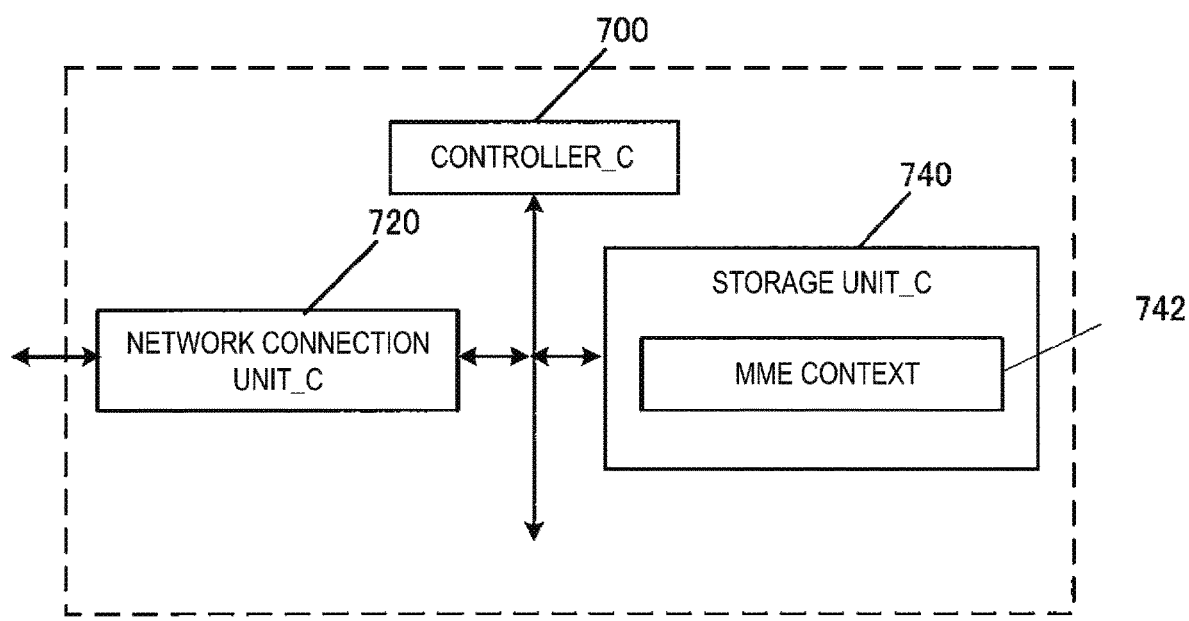
FIG. 7A is a diagram illustrating an apparatus configuration of an MME/CPF/AMF.

A configuration of the MME_A 40, the CPF_A 140, and AMF_A 240 will be described below. FIG. 7A illustrates an apparatus configuration of the MME_A 40, the CPF_A 140, and the AMF_A 240. As illustrated in the drawing, the MME_A 40, the CPF_A 140, and the AMF_A 240 include a network connection unit_C 720, a controller_C 700, and a storage unit_C 740. The network connection unit_C 720 and the storage unit_C 740 are connected to the controller_C 700 via a bus. Note that functions of these units may operate on physical hardware, or logical hardware which is virtually configured on general-purpose hardware.

The controller_C 700 is a function unit for controlling the MME_A 40, the CPF_A 140, and the AMF_A 240. The controller_C 700 implements various processes by reading out various programs stored in the storage unit_C 740 and performing the programs.

The network connection unit_C 720 is a function unit through which the MME_A 40 connects to the base station in the access network and/or the access point in the access network and/or the SCEF_A 46 and/or the HSS_A 50 and/or the SGW_A 35. The network connection unit_C 720 is further a transmission and/or reception unit through which the MME_A 40 transmits and/or receives the user data and/or control information to and/or from the base station in the access network and/or the access point in the access network and/or the SCEF_A 46 and/or the HSS_A 50 and/or the SGW_A 35.

The network connection unit_C 720 is a function unit through which the CPF_140 connects to the base station in the access network and/or the access point in the access network and/or the SCEF_A 46 and/or the HSS_A 50 and/or the UPGW_A 130 and/or the UPF_A 235 and/or the SMF_A 230. Furthermore, the network connection unit_C 720 is a transmission and/or reception unit through which the MME_A 40 transmits and/or receives the user data and/or control information to and/or from the base station in the access network and/or the access point in the access network and/or the SCEF_A 46 and/or the HSS_A 50 and/or the UPGW_A 130 and/or the UPF_A 235.

The storage unit_C 740 is a function unit for storing programs, data, and the like necessary for each operation of the MME_A 40, the CPF_A 140, and the AMF_A 240. The storage unit_C 740 includes, for example, a semiconductor memory, a HUD, or the like. The storage unit_C 740 may store at least identification information and/or control information and/or a flag and/or a parameter included in a control message which is transmitted and/or received in a communication procedure described later.

As illustrated in the drawing, the storage unit_C 740 stores an MME context 742. Hereinafter, information elements stored in the storage unit_C 740 will be described. Note that the MME context may be a storage context by the CPF_140. FIG. 8B illustrates information elements included in the UE context stored for each UE. As illustrated in the drawing, the MME context stored for each UE includes one or multiple pieces of IMSI, MSISDN, MM State, GUTI, ME Identity, UE Radio Access Capability, UE Network Capability, MS Network Capability, Access Restriction, MME F-TEID, SGW F-TEID, eNB Address, MME UE S1AP ID, eNB UE S1AP ID, NR node Address, NR node ID, WAG Address, and WAG ID.

Next, FIG. 9C illustrates the MME context for each PDU session or PDN connection stored for each PDU session or PDN connection. As illustrated in the drawing, the MME context for each PDU session includes APN in Use, Assigned Session Type, IP Address(es), PGW F-TEID, SCEF ID, and Default bearer.

FIG. 9D illustrates the MME context for each bearer stored for each bearer. As illustrated in the drawing, the MME context stored for each bearer includes one or multiple pieces of EPS Bearer ID, TI, SGW PGW F-TEID, MME F-TEID, eNB Address, NR node Address, WAG Address, eNB ID, NR node ID, and WAG ID. Here, the information elements included in the MME context illustrated in FIGS. 8B to 9D may be included in either the MM context or the EPS bearer context and stored.

1.2.4. Configuration of SGW

Figure 10A:
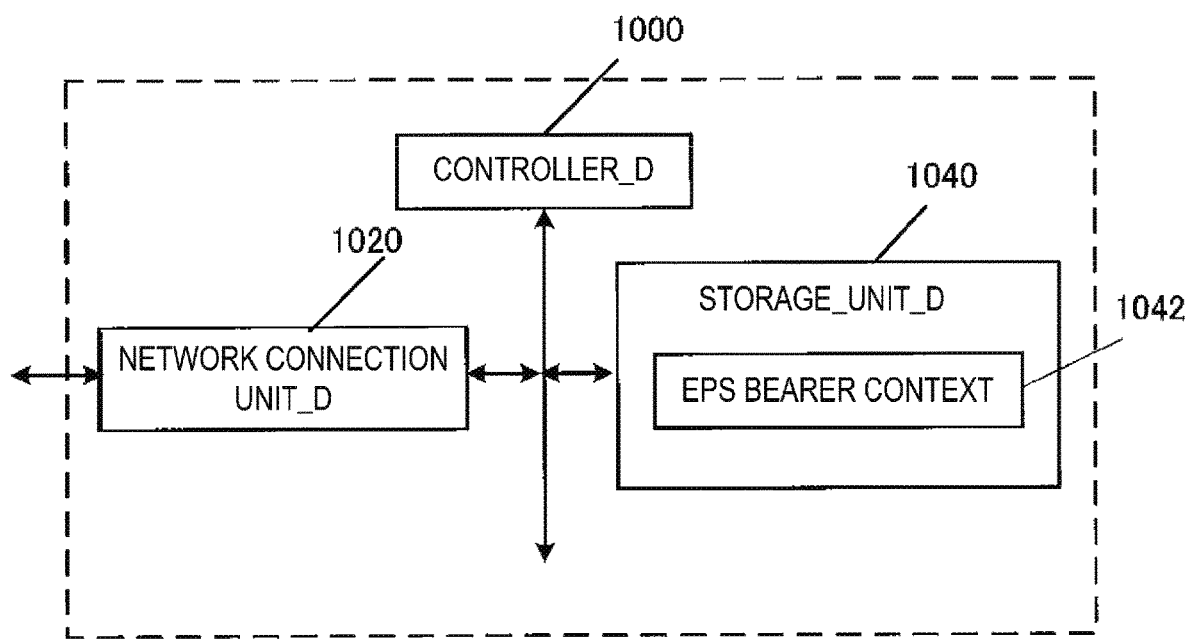
FIG. 10A is a diagram illustrating an apparatus configuration of an SGW/PGW/UPGW/SCEF/SMF/UPF.

FIG. 10A illustrates an apparatus configuration of the SGW_A 35. As illustrated in the drawing, the SGW_A 35 includes a network connection unit_D 1020, a controller_D 1000, and a storage unit_D 1040. The network connection unit_D 1020 and the storage unit_D 1040 are connected to the controller_D 1000 via a bus.

The controller_D 1000 is a function unit for controlling the SGW_A 35. The controller_D 1000 implements various processes by reading out various programs stored in the storage unit_D 1040 and performing the programs.

The network connection unit_D 1020 is a function unit through which the SGW_A 35 connects to the base station in the access network and/or the access point and/or MME_A 40 and/or PGW_A 30 and/or SGSN_A 42. Furthermore, the network connection unit_D 1020 is a transmission and/or reception unit through which the SGW_A 35 transmits and/or receives the user data and/or control information to and/or from the base station in the access network and/or the access point and/or the MME_A 40 and/or the PGW_A 30 and/or the SGSN_A 42.

The storage unit_D 1040 is a function unit for storing programs, data, and the like necessary for each operation of the SGW_A 35. The storage unit_D 1040 includes, for example, a semiconductor memory, a HDD, or the like. The storage unit_D 1040 may store at least identification information and/or control information and/or a flag and/or a parameter included in a control message which is transmitted and/or received in a communication procedure described later.

As illustrated in the drawing, the storage unit_D 1040 stores an EPS bearer context 1042. Note that the EPS bearer context 1042 includes an EPS bearer context stored for each UE, an EPS bearer context stored for each PDU session, and an EPS bearer context stored for each bearer.

First, FIG. 11B illustrates information elements of the EPS bearer context stored for each UE. As illustrated in the drawing, the EPS bearer context stored for each UE includes IMSI, ME Identity, MSISDN, MME F-TEID, and SGW F-TEID.

The EPS bearer context further includes an EPS bearer context for each PDU session stored for each PDU session. FIG. 11C illustrates the EPS bearer context for each PDU session. As illustrated in the drawing, the EPS bearer context for each MU session includes APN in Use, Assigned Session Type, SGW F-TEID, PGW F-TEID, Default Bearer, and IP Address(es).

The EPS bearer context further includes an EPS bearer context for each bearer. FIG. 11D illustrates the EPS bearer context for each bearer. As illustrated in the drawing, the EPS bearer context for each bearer includes one or multiple pieces of EPS Bearer ID, TFT, PGW F-TEID, SGWF-TEID, eNB F-TEID, MME Address, NR node Address, WAG Address, MME ID, NR node ID, and WAG ID.

1.2.5. Configuration of PGW/UPGW/SMF/UPF

FIG. 10A illustrates an apparatus configuration of the PGW_A 30, the UPGW_A 130, the SMF_A 230, and the UPF_A 235. As illustrated in the drawing, the PGW_A 30, the UPGW_A 130, the SMF_A 230, and the UPF_A 235 include a network connection unit_D 1020, a controller_D 1000, and a storage unit_D 1040. The network connection unit_D 1020 and the storage unit_D 1040 are connected to the controller_D 1000 via a bus. Note that functions of these units may operate on physical hardware, or logical hardware which is virtually configured on general-purpose hardware.

The controller_D 1000 is a function unit for controlling the PGW_A 30. The controller_D 1000 implements various processes by reading out various programs stored in the storage unit_D 1040 and performing the programs.

The network connection unit_D 1020 is a function unit through which the PGW_A 30 connects to the SGW_A 35 and/or the PCRF_A 60 and/or the ePDG_A 65 and/or the AAA_A 55 and/or the TWAG_A 74 and/or the PDN_A 5. The network connection unit_D 1020 is a transmission and/or reception unit through which the PGW_A 30 transmits and/or receives the user data and/or control information to and/or from the SGW_A 35 and/or the PCRF_A 60 and/or the ePDG_A 65 and/or the AAA_A 55 and/or the TWAG_A 74 and/or the PDN_A 5.

The network connection unit_D 1020 is a function unit through which the UPGW_A 130 connects to the PCRF_A 60 and/or the NR node_A 122 and/or the PDN_A 5. The network connection unit_D 1020 is a transmission and/or reception unit through which the PGW_A 30 transmits and/or receives the user data and/or control information to and/or from the SGW_A 35 and/or the PCRF_A 60 and/or the ePDG_A 65 and/or the AAA_A 55 and/or the TWAG_A 74 and/or the PDN_A 5.

The network connection unit_D 1020 is a function unit through which the SMF_A 230 connects to the AMF_A 240 and/or the UPF_A 235 and/or the HSS_A 50 and/or the PCRF_A 60. The network connection_D unit 1020 is a transmission and/or reception unit through which the SMF_A 230 transmits and/or receives the control information to and/or from the AMF_A 240 and/or the UPF_A 235 and/or the HSS_A 50.

The network connection unit_D 1020 is a function unit through which the UPF_A 235 connects to the NR node_A 122 and/or the SMF_A 230 and/or the PDN_A 5 and/or the DN_B 105. The network connection unit_D 1020 is a transmission and/or reception unit through which the UPF_A 235 transmits and/or receives the user data and/or control information to and/or from the NR node_A 122 and/or the SMF_A 230 and/or the PDN_A 5 and/or the DN_B 105.

The storage unit_D 1040 is a function unit for storing programs, data, and the like necessary for each operation of the PGW_A 30. The storage unit_D 1040 includes, for example, a semiconductor memory, a HDD, or the like. The storage unit_D 1040 may store at least identification information and/or control information and/or a flag and/or a parameter included in a control message which is transmitted and/or received in a communication procedure described later.

As illustrated in the drawing, the storage unit_D 1040 stores an EPS hearer context 1042. Note that the EPS bearer context 1042 may include an EPS bearer context stored for each UE, an EPS bearer context stored for each APN, an EPS bearer context stored for each PDU session or PDN connection, and an EPS bearer context stored for each bearer which may be separately stored in the EPS bearer context. The EPS bearer context may be further a context stored by the UPGW_A 130 and/or the SMF_A 230 and/or the UPF_A 235.

FIG. 12B illustrates information elements included in the EPS bearer context stored for each UE. As illustrated in the drawing, the EPS bearer context stored for each UE includes IMSI, ME identity, MSISDN, and RAT type.

Next, FIG. 12C illustrates the EPS bearer context stored for each APN. As illustrated in the drawing, the EPS bearer context stored for each APN of the storage unit of the PGW includes APN in use. Note that the EPS bearer context stored for each APN may be stored for each Data Network Identifier.

FIG. 12D illustrates the EPS bearer context for each PDU session or PDN connection stored for each PDU session or PDN connection. As illustrated in the drawing, the EPS bearer context for each PDU session or PDN connection includes Assigned Session Type, IP Address(es), SGW F-TEID, PGW F-TEID, and Default Bearer.

FIG. 12E illustrates the EPS bearer context stored for each EPS bearer. As illustrated in the drawing, the EPS bearer context includes EPS Bearer ID, TFT, SGW F-TEID, and PGW F-TEID.

1.2.6. Configuration of SCEF

FIG. 10A illustrates an apparatus configuration of the SCEF_A 46. As illustrated in the drawing, the SCEF_A 46 includes a network connection unit_D 1020, a controller_D 1000, and a storage unit_D 1040. The network connection unit_D 1020 and the storage unit_D 1040 are connected to the controller_D 1000 via a bus.

The controller_D 1000 is a function unit for controlling the SCEF_A 46. The controller_D 1000 implements various processes by reading out various programs stored in the storage unit_D 1040 and performing the programs. The network connection unit_D 1020 is a function unit through which the SCEF_A 46 connects to the core network_B 190. In other words, the network connection unit_D 1020 is a function unit through which the SCEF_A 46 connects to the MME_A 40. The network connection unit_D 1020 is a transmission and/or reception unit through which the SCEF_A 46 transmits and/or receives the user data and/or control information to and/or from the MME_A 40.

The storage unit_D 1040 is a function unit for storing programs, data, and the like necessary for each operation of the SCEF_A 46. The storage unit_D 1040 includes, for example, a semiconductor memory, a HDD, or the like. The storage unit_D 1040 may store at least identification information and/or control information and/or a flag and/or a parameter included in a control message which is transmitted and/or received in a communication procedure described later.

As illustrated in the drawing, the storage unit_D 1040 stores an EPS bearer context 1042. Hereinafter, information elements stored in the storage unit_D 1040 will be described. FIG. 13B illustrates information elements included in the EPS bearer context. As illustrated in the drawing, the EPS bearer context includes User Identity, APN in Use, EPS Bearer ID, and Serving Node Information.

1.3. Description of Initial Procedure

Next, before describing the detailed steps of initial procedure in the present embodiment, in order to avoid redundant descriptions, terminology specific to the present embodiment and primary identification information used in each procedure will be described beforehand.

In the present embodiment, a network is an access network and/or the core network_B 190 and/or the PDN_A 5. The network may also indicate any apparatus included in the access network and/or the core network_B 190 and/or PDN_A 5. In other words, the network performing the transmission and/or reception of a message and/or processing means an apparatus in the network performing the transmission and/or reception of the message and/or processing.

A first DN in the present embodiment is a general DN. The DN may be a DN which is not a DN for the first Mobile Edge Computing (MEC). Furthermore, the first N can be a DN that is not a local DN, or may be a DN in which 3rd party services are hosted and which is located far from the UE_A 10's access point of attachment. Note that the first DN may be expressed as the PDN_A 5, and the PDN_A 5 may be expressed as the first DN.

The second DN in the present embodiment may be a DN for the Mobile Edge Computing (MEC). The second DN can be a local DN, or may be a DN in which 3rd party services are hosted and which is located close to the UE_A 10's access point of attachment. Note that the second DN may be expressed as the DN_B 105, and the DN_B 105 may be expressed as the second DN.

A first timer in the present embodiment is a back-off timer that indicates the initiation of the procedure for session management such as PDU session establishment procedure, and/or prohibition of transmission of a Session Management (SM) message such as a PDU session establishment request message. While the first timer is running, the initiation of the procedure for session management and/or transmission and/or reception of the SM message of each apparatus may be prohibited.

Note that the SM message may be a NAS message used in the procedure for session management, or may be a control message transmitted and/or received between the UE_A 10 and the SMF_A 230 via the AMF_A 240. Furthermore, the SM message may include a PDU session establishment request message, a PDU session establishment accept message, a PDU session complete message, a PDU session reject message, a PDU modification request message, a PDU session modification accept message, a PDU session modification reject message, and the like. Furthermore, the procedure for session management may include the PDU session establishment procedure, the PDU session modification procedure, and the like.

A second timer in the present embodiment is a backoff timer that indicates the initiation of the registration procedure and/or prohibition of the transmission of the Registration request message. While the second timer is running, the initiation of the registration procedure and/or transmission and/or reception of the Registration request message of each apparatus may be prohibited.

Figure 2:
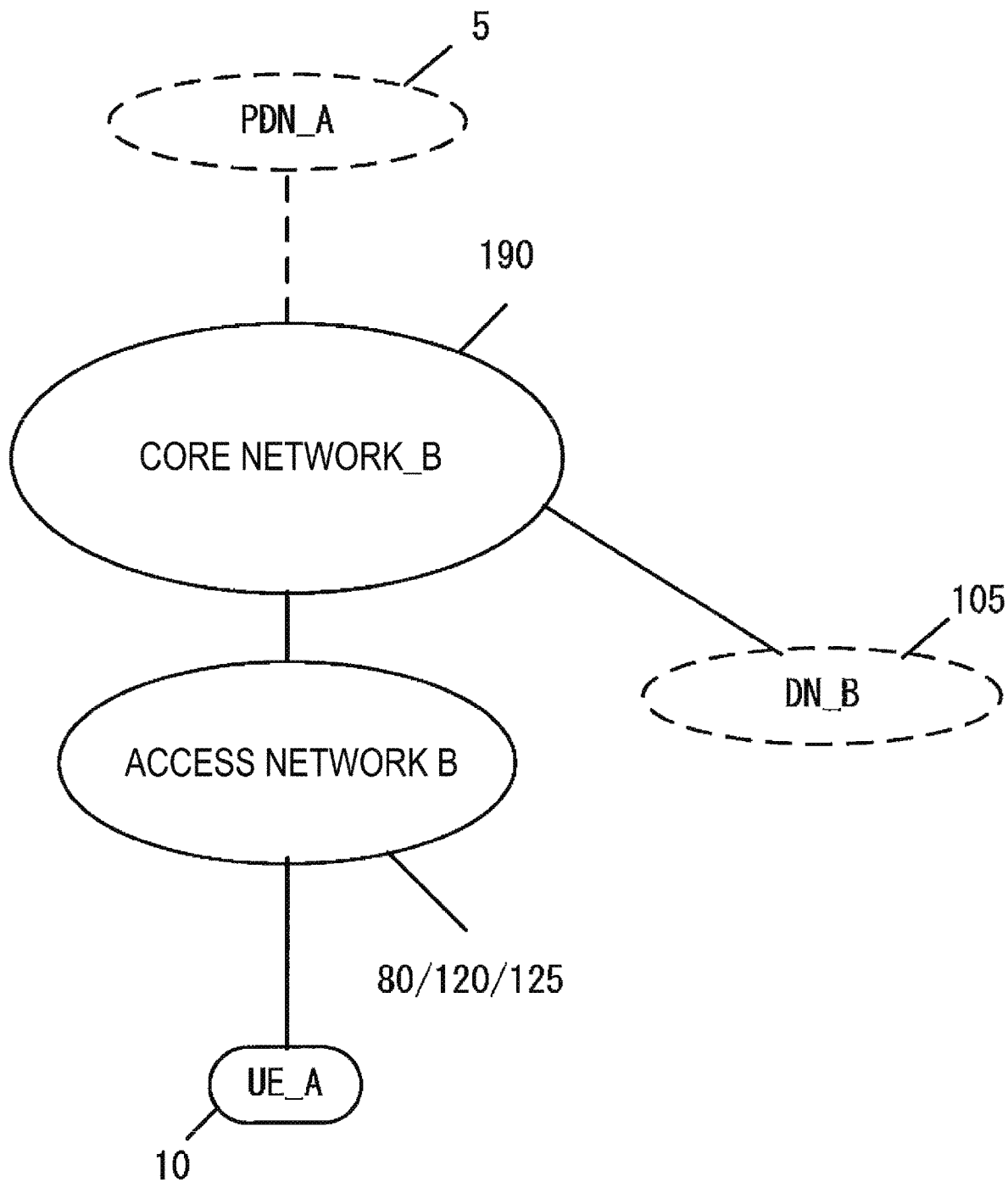
FIG. 2 is a diagram illustrating a first state.

As illustrated in FIG. 2, the first state in the present embodiment is a state in which each apparatus has established a PDU session connected to the second DN. Note that the PDU session connected to the second DN may be connected to the first DN separate from the second DN, or may not be connected to the first DN.

Furthermore, the first state may be a state where the UE_A 10 is able to perform user data communication with the second DN, or a state in which user data communication can be performed between the UE_A 10 and the AF on the second DN. Note that the first state may be a state in which the UE_A 10 is able to perform user data communication with the second DN and the first DN, or a state in which user data communication can be performed between the UE_A 10 and the AF on the second DN and the AF on the first DN.

A tracking area in the present embodiment is a singular or multiple ranges which the core network manages and can be represented by the location information of the UE_A 10. The tracking area may be configured to include multiple cells. The tracking area may be a range in which a control message such as paging is broadcast, or a range in which the UE_A 10 can move without a handover procedure. The tracking area may be a routing area, a location area, or those similar to them. Hereinafter, the tracking area may be Tracking Area (TA).

A TA list in the present embodiment is a list including one or more TAs which the network has assigned to the UE_A 10. Note that the UE_A 10 may be able to move without performing the tracking area update procedure while moving within one or more TAs included in the TA list. In other words, for the UE_A 10, the TA list may be a group of information indicating an area in which the UE_A 10 can move without performing the tracking area update procedure.

The Network Slice Instance (NSI) in the present embodiment is an entity of each of one or multiple Network Slices configured in the core network_B 190. The NSI in the present embodiment may be configured to include a virtual Network Function (NF) generated using a Network Slice Template (NST). Here, the NST is associated with a resource request for providing a required communication service or capability, and is a logical expression of one or multiple Network Functions (NFs).

Specifically, the NSI may be an aggregation constituted by multiple NFs in the core network_B 190. The NSI may be a logical network configured to classify the user data delivered through a service or the like. The network slice may be configured to include at least one or more NFs. The NF included in the network slice may be or may not be an apparatus shared by another network slice.

The UE can be assigned to one or multiple network slices, based on LIE usage type and/or one or multiple network slice type IDs and/or registration information such as one or multiple NS IDs and/or the APN.

Session and Service Continuity (SSC) mode indicates a mode of Session and Service Continuity supported by a system and/or each apparatus in the 5GC. To be more specific, the SSC mode may be a mode indicating a type of the session and service continuity supported by a PDU session established between the UE_A 10 and Terminating User-Plane Function (TUPF). Here, the TUPF may be the UPGW_A 130, or may be the UPF_A 235. Note that the SSC mode may be a mode indicating a type of the session and service continuity configured for each PDU session. The SSC mode may be configured to include three modes of SSC mode 1, SSC mode 2, and SSC mode 3.

Here, the TUPF may be a Network Function (NF) for a User Plane (U-Plane). Furthermore, the TUPF may be located in the core network or may be located in the access network.

SSC mode 1 in the present embodiment is a mode of the session and service continuity in which the same TUPF is continuously maintained regardless of the access technology such as the Radio Access Technology (RAT) and the cell the UE_A 10 uses to connect to a network. To be more specific, SSC mode 1 may be a mode in which even in a case that the mobility of the UE_A 10 occurs, the session and service continuity is achieved without modifying the TUPF used by the established PDU session.

SSC mode 2 in the present embodiment is a mode of the session and service continuity in which the same TUPF is continuously maintained only in a serving area of the TUPF. To be more specific, SSC mode 2 may be a mode in which so long as the UE_A 10 is in the serving area of the TUPF, the session and service continuity is achieved without modifying the TUPF used by the established PDU session, SSC mode 2 may be a mode in which in a case that the mobility that the UE_A 10 leaves the serving area of the TUPF occurs, the session and service continuity is achieved by modifying the TUPF used by the established PDU session.

Here, the serving area of the TUPF may be an area in which one TUPF can provide a session and service continuity function, or a subset of the access network such as the RAT or the cell used in a case that the UE_A 10 connects to a network. The subset of the access network may be a network including one or multiple RATs and/or cells, or may be a TA.

SSC mode 3 in the present embodiment is a mode of the session and service continuity that allows a new PDU session and/or communication path to be established via a new TUPF to the same DN before releasing a PDU session and/or communication path established between the UE_A 10 and the TUPF. SSC mode 3 may be a mode of the session and service continuity that accepts the UE_A 10 to be multi-homed.

And/or, SSC mode 3 may be a mode that allows the session and service continuity using multiple PDU sessions and/or the TUPF's associated with the PDU sessions. In other words, in the case of SSC mode 3, each apparatus may achieve the session and service continuity by using multiple PDU sessions, or may achieve the session and service continuity by using multiple TUPFs.

Here, in the case that each apparatus establishes a new PDU session and/or communication path, a new TUPF may be selected by the network, or a new TUPF may be an optimal TUPF for a place at which the UE_A 10 connects to the network. In a case that multiple PDU sessions and/or the TUPFs used by the PDU sessions are effective, the UE_A 10 may associate the application and/or flow communication with to a new established PDU session, immediately or based on completion of the communication.

Next, the identification information in the present embodiment will be described. The first identification information in the present embodiment is capability information indicating that the UE_A 10 supports connection to the second DN. In other words, the first identification information may be information indicating that the UE_A 10 supports establishment of a PDU session connected to the second DN.

Note that the PDU session connected to the second DN may be a PDU session established between the second DN and the UE_A 10, or a PDU session established between the UPF_A 235 connecting the core network and the second DN, and the UE_A 10. Furthermore, the PDU session connecting to the second DN may be a PDU session for use in user data communication between the second DN and the UE_A 10.

The 11th identification information in the present embodiment is capability information indicating that the network supports connection to the second DN. In other words, the 11th identification information may be information indicating that the network supports the establishment of the PDU session that connects to the second DN, or may be information indicating that the network accepts the establishment of the PDU session that connects to the second DN.

The 12th identification information in the present embodiment is information indicating a cause value (cause). The 12th identification information may be information indicating that some of the request has been rejected.

Furthermore, the 12th identification information may be information indicating that establishment of the PDU session connecting to the second DN is temporarily prohibited, or may be information indicating that modifying the connection destination of the PDU session being established to the second DN is temporarily prohibited.

Furthermore, the 12th identification information may be information indicating that establishment of the PDU session connecting to the second DN is prohibited in the cell and/or TA to which the UE_A 10 is currently connected, or may be information indicating that modifying the connection destination of the PDU session being established to the second DN is prohibited.

Furthermore, each of the 12th identification information, information indicated by the 12th identification information, and/or the information indicated by the 13th identification information may be included in single identification information. In other words, the 12th identification information, any one of identification information from the 13th identification information to the 13th identification information may be included in single identification information including the meaning of the respective identification information. Accordingly, the 12th identification information and the 13th identification information may be included in the control message as single identification information having the meaning of the two pieces of identification information.

The 13th identification information in the present embodiment is information indicating the value of the first timer. The UE_A 10 may configure a value indicated by the 13th identification information on the first timer, or may initiate performing the first timer, based on the reception of the 13th identification information.

The 14th identification information in the present embodiment is a DNN indicating the DN to which the UE_A 10 is accessible in the currently connected cell and/or TA. Furthermore, the 14th identification information may be a DNN indicating the DN to which the UE_A 10 is allowed to access as the second DN in the current cell and/or TA. Note that the 14th identification information may include one or more DNNs. Furthermore, each DNN may be associated with information indicating whether or not it is the second DN.

The 21st identification information in the present embodiment is information indicating the cause value (cause) indicating that the present procedure has been rejected. The 21st identification information may be information indicating that the network does not support the connection to the second DN, or may be information indicating that the network does not allow the connection to the second DN.

Furthermore, the 21st identification information may be information indicating that the connection to the second DN is temporarily prohibited, or may be information indicating that the connection to the second DN is prohibited in the cell and/or TA to which the UE_A 10 is currently connected.

Furthermore, each of the 21st identification information, information indicated by the 21st identification information, and/or the information indicated by the 22nd identification information may be single identification information. In other words, the 21st identification information, any one of identification information from the 22nd identification information to the 22nd identification information may be single identification information including the meaning of the respective identification information. Accordingly, the 21st identification information and the 22nd identification information may be included in the control message as single identification information having the meaning of the two pieces of identification information.

The 22nd identification information in the present embodiment is information indicating the value of the second timer. The UE_A 10 may configure a value indicated by the 22nd identification information on the second timer, or may initiate performing the second timer, based on the reception of the 22nd identification information.

The 31st identification information in the present embodiment is information indicating a request to make a new connection destination of the PDU session to be established or modified by the present procedure to be the second DN, and/or information indicating a request to make a communication destination of the user data communication that can be performed using each piece of identification information requested in conjunction with the 31st identification information to be the second DN. The 31st identification information may be associated with one or more pieces of identification information from the 32nd identification information to the 35th identification information.

More specifically, by associating the 31st identification information and the 32nd identification information with each other, it may be indicated that the DN requested by the 32nd identification information is the second DN, or by associating the 31st identification information and the 33rd identification information with each other, it may be indicated that the connection destination of the PDU session requested by the 33rd identification information is the second DN. By associating the 31st identification information and the 34th identification information with each other, it may be indicated that the PDU session type and/or address requested by the 34th identification information is the PDU session type and/or address which is used in user data communication performed with the second DN, or by associating the 31st identification information and the 34th identification information with each other, it may be indicated that the TFT requested by the 34th identification information is the TFT used in user data communication performed with the second DN.

Furthermore, the 31st identification information, information indicating that the 31st identification information indicates the second DN, and/or each piece of the information indicated by the 32nd identification information to the 35th identification information may be single identification information. In other words, the 31st identification information, any one of identification information from the 32nd identification information to the 35th identification information may be single identification information including the meaning of the respective identification information.

Accordingly, the 31st identification information and the 32nd identification information may be included in the control message as a single piece of identification information having the meanings of the two pieces of identification information, and the 31st identification information and the 33rd identification information may be included in the control message as a single piece of identification information having the meanings of the two pieces of identification information. Furthermore, the 31st identification information and the 33rd identification information may be included in the control message as a single piece of identification information having the meanings of the two pieces of identification information, and the 31st identification information and the 34th identification information may be included in the control message as a single piece of identification information having the meanings of the two pieces of identification information.

Furthermore, the 31st identification information may be information indicating a request for establishment or modification of the PDU session. Furthermore, the 31st identification information may be information indicating a request to establish the PDU session to connect to the second DN, or may be information indicating a request to modify the PDU session connection destination to the second DN.

The 32nd identification information in the present embodiment is information indicating a Data Network Name (DNN). The 32nd identification information may be information indicating a request to make the connection destination of the PDU session established or modified by the present procedure to be the DN identified by the DNN indicated by the present identification information, or may indicate a request to make the connection destination of the PDU session to be the second DN. Furthermore, the 32nd identification information may include multiple pieces of information indicating the DNN, or may include information indicating whether or not each DNN is the second DN.

Furthermore, the 32nd identification information may be information indicating a request to establish the PDU session to connect to the second DN, or may be information indicating a request to modify the PDU session connection destination to the second DN, or may be information indicating a request for the PDU session established or modified by the present procedure to be the PDU session used in the user data communication performed on the second DN.

The 33rd identification information in the present embodiment is information indicating the PDU session ID. The 33rd identification information may be information indicating a request to establish or modify the PDU session identified by the PDU session ID indicated by the present identification information, or may indicate a request to make a new connection destination of the PDU session identified by the PDU session ID indicated by the present identification information to be the second DN.

Furthermore, the 33rd identification information may be information indicating a request to establish the PDU session to connect to the second DN, or may be information indicating a request to modify the PDU session connection destination to the second DN, or may be information indicating a request for the PDU session established or modified by the present procedure to be the PDU session used in the user data communication performed on the second DN.

The 34th identification information in the present embodiment is information indicating a PDU session Type. The 34th identification information may be information indicating an address. Note that the PDU session type may be IPv4, IPv6, Ethernet, Unstructured or the like. Furthermore, the address may be IPv4 address, IPv6 address, IPv6 prefix, or information identifying the UE_A 10 used in communication such as Ethernet and Unstructured. Note that the PDU session type and address are not limited to these.

Furthermore, the 34th identification information may be information indicating a request to make the PDU session type of the PDU session established or modified by the present procedure to be the PDU session type indicated by the present identification information, or may be information indicating a request to make the address associated with the PDU session established or modified by the present procedure to be the address indicated by the present identification information, and/or the address of the PDU session type indicated in the present embodiment.

Furthermore, the 34th identification information may be information indicating a request to make the PDU session type of the address used in the user data communication performed on the second DN to be the PDU session type indicated by the present identification information, or may be information indicating a request to make the address used in the user data communication performed on the second DN to be the address indicated by the present identification information and/or the address of the PDU session type indicated in the present embodiment.

Furthermore, the 34th identification information may include multiple pieces of information indicating PDU session types and/or addresses, may include information indicating whether each PDU session type is a PDU session type used in user data communication performed on the second DN, or may include information indicating whether each address is an address used in the user data communication performed on the second DN.

Furthermore, the 34th identification information may be information indicating a request to establish the PDU session to connect to the second. DN, or may be information indicating a request to modify the PIM session connection destination to the second DN, or may be information indicating a request for the PDU session established or modified by the present procedure to be the PDU session used in the user data communication performed on the second DN.

The 35th identification information in the present embodiment is information indicating a TFT. The 35th identification information may be information indicating a request to make the TFT associated with the PDU session established or modified by the present procedure to be the TFT indicated by the present identification information, or may be information indicating a request to make the TFT used in the user data communication performed on the second DN to be the TUFT indicated by the present identification information.

Furthermore, the 35th identification information may include multiple pieces of information indicating TFTs, or may include information indicating whether or not each TFT is a TUFT used in user data communication performed on the second DN.

Furthermore, the 35th identification information may be information indicating a request to establish the PDU session to connect to the second DN, or may be information indicating a request to modify the PDU session connection destination to the second DN, or may be information indicating a request for the PDU session established or modified by the present procedure to be the PDU session used in the user data communication performed on the second DN.

The 41st identification information in the present embodiment may be information indicating that a new connection destination of the PDU session established or modified by the present procedure is the second DN, and/or may be information indicating that the communication destination of the user data communication that can be performed using the identification information transmitted and/or received with the 41st identification information is the second DN. The 41st identification information may be transmitted and/or received in association with one or more pieces of identification information of the 42nd identification information to the 45th identification information.

More specifically, by associating the 41st identification information and the 42nd identification information with each other, it may be indicated that the DN identified by the DNN indicated by the 42nd identification information is the second DN, and by associating the 41st identification information and the 43rd identification information with each other, it may be indicated that the PDU session connection destination identified by the PDU session ID indicated by the 43rd identification information is the second DN. Furthermore, by associating the 41st identification information and the 44th identification information with each other, it may be indicated that the address indicated by the 44th identification information and/or the address of the PDU session type indicated by the 44th identification information is an address used in user data communication performed with the second DN, and by associating the 41st identification information and the 44th identification information with each other, it may be indicated that the TFT indicated by the 44th identification information is a TFT used in the user data communication performed with the second DN.

Furthermore, the 41st identification information, information indicating that the 41st identification information indicates the second DN, and/or each piece of the information indicated by the 42nd identification information to the 45th identification information may be single identification information. In other words, the 41st identification information, any one of identification information from the 42nd identification information to the 45th identification information may be single identification information including the meaning of the respective identification information.

Accordingly, the 41st identification information and the 42nd identification information may be included in the control message as a single piece of identification information having the meanings of the two pieces of identification information, and the 41st identification information and the 43rd identification information may be included in the control message as a single piece of identification information having the meanings of the two pieces of identification information. Furthermore, the 41st identification information and the 43rd identification information may be included in the control message as a single piece of identification information having the meanings of the two pieces of identification information, and the 41st identification information and the 44th identification information may be included in the control message as a single piece of identification information having the meanings of the two pieces of identification information.

Furthermore, the 41st identification information may be information indicating that a request for establishment or modification of the PDU session has been accepted. Furthermore, the 41st identification information may be information indicating that establishment of the PDU session connected to the second DN are allowed, or may be information indicating that modification of the PDU session connection destination to the second DN is allowed.

The 42nd identification information in the present embodiment is information indicating a DNN. The 42nd identification information may be information indicating that the connection destination of the PDU session established or modified by the present procedure becomes the DN identified by the DNN indicated by the present identification information, or may indicate that the connection destination of the PDU session becomes the second DN. Furthermore, the 42nd identification information may include multiple pieces of information indicating the DNN, or may include information indicating whether or not each DNN is the second DN.

Furthermore, the 42nd identification information may be information indicating that the PDU session that connects to the second DN has been established, may be information indicating that the PDU session connection destination has been modified to the second DN, or may be information indicating that the PDU session established or modified by the present procedure becomes the PDU session used in the user data communication performed on the second DN.

The 43rd identification information in the present embodiment is information indicating the PDU session ID. The 43rd identification information may be information indicating that the PDU session identified by the PDU session ID indicated by the present identification information is established or modified, or may indicate that a new connection destination of the PDU session identified by the PDU session ID indicated by the present identification information becomes the second DN.

Furthermore, the 43rd identification information may be information indicating that the PDU session that connects to the second DN has been established, may be information indicating that the PDU session connection destination has been modified to the second DN, or may be information indicating that the PDU session established or modified by the present procedure becomes the PDU session used in the user data communication performed on the second DN.

The 44th identification information in the present embodiment is information indicating the PDU session type. The 44th identification information may be information indicating an address. Furthermore, the 44th identification information may be information indicating that the PDU session type of the PDU session established or modified by the present procedure has become the PDU session type indicated by the present identification information, or may be information indicating that the address associated with the PDU session established or modified by the present procedure has become the address indicated by the present identification information, and/or the address of the PDU session type indicated in the present embodiment.

Furthermore, the 44th identification information may be information indicating that the PDU session type of the address used in the user data communication performed on the second DN has become the PDU session type indicated by the present identification information, or may be information indicating that the address used in the user data communication performed on the second DN has become the address indicated by the present identification information and/or the address of the PDU session type indicated in the present embodiment.

Furthermore, the 44th identification information may include multiple pieces of information indicating PDU session types and/or addresses, may include information indicating whether each PDU session type is a PDU session type used in user data communication performed on the second DN, or may include information indicating whether each address is an address used in the user data communication performed on the second DN.

Furthermore, the 44th identification information may be information indicating that the PDU session that connects to the second DN has been established, may be information indicating that the PDU session connection destination has been modified to the second DN, or may be information indicating that the PDU session established or modified by the present procedure becomes the PDU session used in the user data communication performed on the second DN.

The 45th identification information in the present embodiment is information indicating a TFT. The 45th identification information may be information indicating that the TFT associated with the PDU session established or modified by the present procedure has become the TFT indicated by the present identification information, or may be information indicating that the TFT used in the user data communication performed on the second DN has become the TFT indicated by the present identification information.

Furthermore, the 45th identification information may include multiple pieces of information indicating TFTs, or may include information indicating whether or not each TFT is a TFT used in user data communication performed on the second DN.

Furthermore, the 45th identification information may be information indicating that the PDU session that connects to the second DN has been established, may be information indicating that the PDU session connection destination has been modified to the second DN, or may be information indicating that the PDU session established or modified by the present procedure becomes the PDU session used in the user data communication performed on the second DN.

The 51st identification information in the present embodiment is information indicating the cause value (cause) indicating that the present procedure has been rejected. The 51st identification information may be information indicating that a request for establishment of the PDU session to connect to the second DN is rejected.

Furthermore, the 51st identification information may be information indicating that a request for establishment of the PDU session to connect to the second DN is rejected, or may be information indicating that a request to modify the connection destination of the PDU session established to the second DN is rejected. Furthermore, the 51st identification information may be information indicating that a request to make the communication destination of the user data communication using each of the identification information received in the request message to be the second DN is rejected.

Furthermore, the 51st identification information may be information indicating that establishment of the PDU session connecting to the second DN is temporarily prohibited, or may be information indicating that modification of the connection destination of the PDU session being established to the second DN is temporarily prohibited.

Furthermore, the 51st identification information may be information indicating that establishment of the PDU session connecting to the second DN is prohibited in the cell and/or TA to which the UE_A 10 is currently connected, or may be information indicating that modification of the connection destination of the PDU session being established to the second DN is prohibited.

Note that the 51st identification information may include the meanings of one or more pieces of identification information of the 52nd identification information to the 56th identification information. Furthermore, each of the 51st identification information, information indicated by the 51st identification information, and/or the information indicated by the 52nd identification information to the 56th identification information may be single identification information. In other words, the 51st identification information, any one of identification information from the 52nd identification information to the 56th identification information may be single identification information including the meaning of the respective identification information.

Accordingly, the 51st identification information and the 52nd identification information may be included in the control message as a single piece of identification information having the meanings of the two pieces of identification information, and the 51st identification information and the 53rd identification information may be included in the control message as a single piece of identification information having the meanings of the two pieces of identification information. Furthermore, the 51st identification information and the 53rd identification information may be included in the control message as a single piece of identification information having the meanings of the two pieces of identification information, and the 51st identification information and the 54th identification information may be included in the control message as a single piece of identification information having the meanings of the two pieces of identification information. Furthermore, the 51st identification information and the 56th identification information may be included in the control message as single identification information having the meaning of the two pieces of identification information.

The 52nd identification information in the present embodiment is information indicating a DNN. The 52nd identification information may be information indicating that the connection destination of the PDU session established or modified by the present procedure cannot be the DN identified by the DNN indicated by the present identification information, or may indicate that the connection destination of the PDU session cannot be the second DN. Furthermore, the 52nd identification information may include information indicating whether or not each DNN is the second DN.

Furthermore, the 52nd identification information may be information indicating that the PDU session connecting to the second DN cannot be established, may be information indicating that the connection destination of the PDU session cannot be modified to the second DN, or may be information indicating that the PDU session established or modified by the present procedure cannot be the PDU session used in the user data communication performed on the second DN.

Note that the 52nd identification information and the 51st identification information may be single identification information including the meaning of the respective identification information. Thus, in the present embodiment, in a case that it is described that the 52nd identification information and the 51st identification information are transmitted or included in the control message, the two pieces of identification information may be transmitted or included in the control message as a single piece of identification information having each meaning.

The 53rd identification information in the present embodiment is information indicating that the requested PDU session ID is inappropriate. The 53rd identification information may be information indicating that the PDU session identified by the PDU session ID indicated by the present identification information cannot be established or modified, or may indicate that a new connection destination of the PDU session identified by the PDU session ID indicated by the present identification information cannot be the second DN.

Furthermore, the 53rd identification information may be information indicating that the PDU session connecting to the second DN cannot be established, may be information indicating that the connection destination of the PDU session cannot be modified to the second DN, or may be information indicating that the PDU session established or modified by the present procedure cannot be the PDU session used in the user data communication performed on the second DN.

Note that the 53rd identification information and the 51st identification information may be single identification information including the meaning of the respective identification information. Thus, in the present embodiment, in a case that it is described that the 53rd identification information and the 51st identification information are transmitted or included in the control message, the two pieces of identification information may be transmitted or included in the control message as a single piece of identification information having each meaning.

The 54th identification information in the present embodiment is information indicating that the requested PDU session type is inappropriate. The 54th identification information may be information indicating that the requested address is inappropriate. Furthermore, the 54th identification information may be information indicating that the PDU session type of the PDU session established or modified by the present procedure cannot be the PDU session type indicated by the present identification information, or may be information indicating that the address associated with the PDU session established or modified by the present procedure cannot be the address indicated by the present identification information and/or the address of the PDU session type indicated in the present embodiment.

Furthermore, the 54th identification information may be information indicating that the PDU session type of the address used in the user data communication performed on the second DN cannot be the PDU session type indicated by the present identification information, or may be information indicating that the address used in the user data communication performed on the second DN cannot be the address indicated by the present identification information and/or the address of the PDU session type indicated in the present embodiment.

Furthermore, the 54th identification information may be information indicating that the PDU session connecting to the second DN cannot be established, may be information indicating that the connection destination of the PDU session cannot be modified to the second DN, or may be information indicating that the PDU session established or modified by the present procedure cannot be the PDU session used in the user data communication performed on the second DN.

Note that the 54th identification information and the 51st identification information may be single identification information including the meaning of the respective identification information. Thus, in the present embodiment, in a case that it is described that the 54th identification information and the 51st identification information are transmitted or included in the control message, the two pieces of identification information may be transmitted or included in the control message as a single piece of identification information having each meaning.

The 55th identification information in the present embodiment is information indicating that the requested TFT is inappropriate. The 55th identification information may be information indicating that the TFT associated with the PDU session established or modified by the present procedure cannot be the TFT indicated by the present identification information, or may be information indicating that the TFT used in the user data communication performed on the second DN cannot be the TFT indicated by the present identification information.

Furthermore, the 55th identification information may be information indicating that the PDU session connecting to the second DN cannot be established, may be information indicating that the connection destination of the PIM session cannot be modified to the second DN, or may be information indicating that the PDU session established or modified by the present procedure cannot be the PDU session used in the user data communication performed on the second DN.

Note that the 55th identification information and the 51st identification information may be single identification information including the meaning of the respective identification information. Thus, in the present embodiment, in a case that it is described that the 55th identification information and the 51st identification information are transmitted or included in the control message, the two pieces of identification information may be transmitted or included in the control message as a single piece of identification information having each meaning.

The 56th identification information in the present embodiment is information indicating the value of the first timer. The UE_A 10 may configure a value indicated by the 56th identification information on the first timer, or may initiate performing the first timer based on the reception of the 56th identification information.

Figure 14:
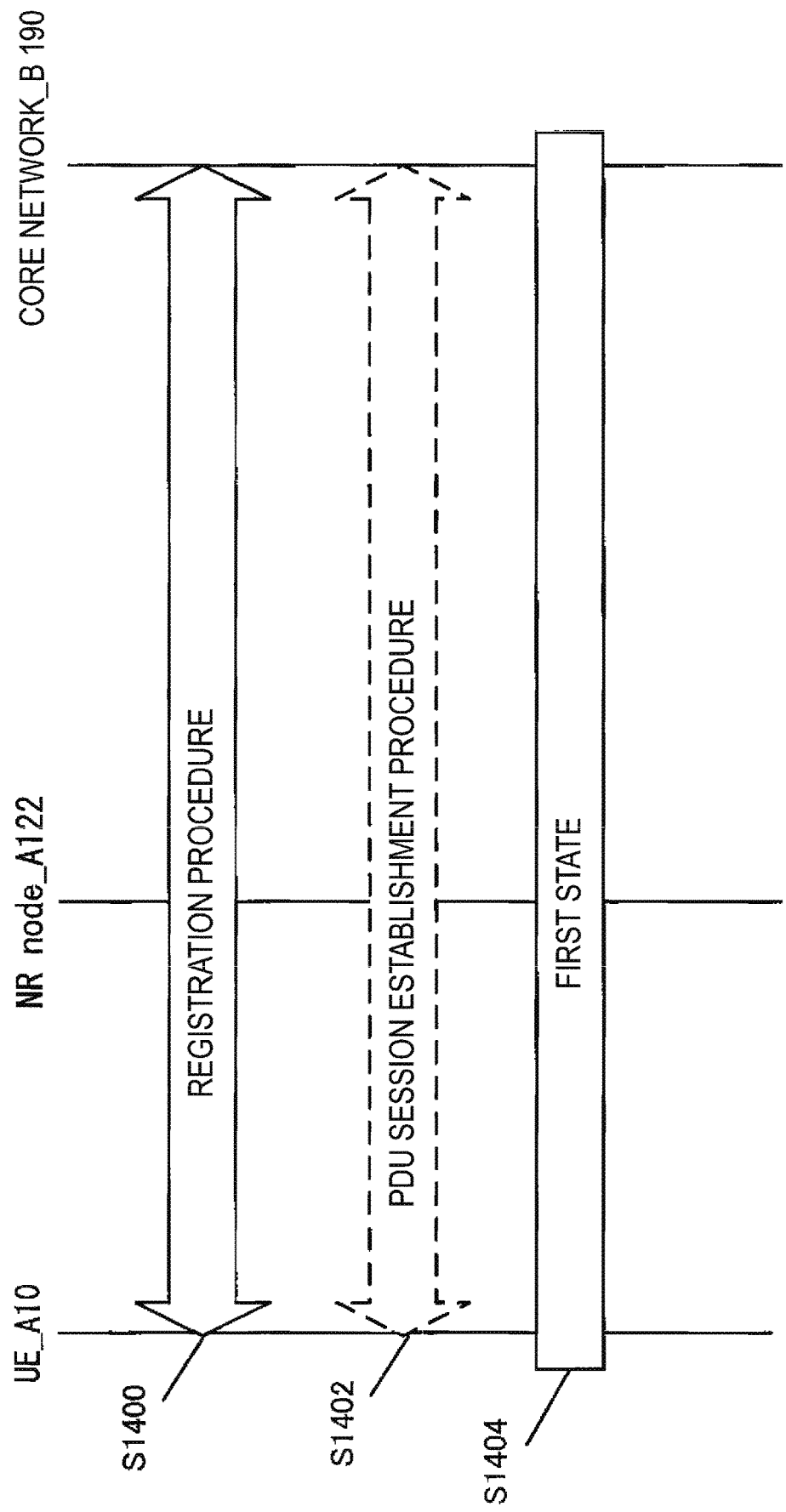
FIG. 14 is a diagram illustrating an initial procedure.

Next, an initial procedure according to the present embodiment will be described with reference to FIG. 14. In the present embodiment, each apparatus transitions to the first state by performing an initial procedure, and the UE_A 10 establishes a session through the core network_B 190. Hereinafter, the present procedure refers to the initial procedure, and each procedure includes a registration procedure and a PDU session establishment procedure. Details of each procedure will be described below.

In the present procedure, each apparatus at first performs a registration procedure (S1400) and enters a state in which the UE_A 10 attaches to the network. Then, each apparatus performs a PDU session establishment procedure (S1402) and transitions to the first state (S1404). Note that each apparatus may exchange various capability information and/or various request information of each apparatus in the registration procedure and/or the PDU session establishment procedure.

Note that in a case of having performed exchange of various information and/or negotiation of various request in the registration procedure, each apparatus may not perform exchange of various information and/or negotiation of various request in the PDU session establishment procedure. On the contrary, in a case of not having performed exchange of various information and/or negotiation of various request in the registration procedure, each apparatus may perform exchange of various information and/or negotiation of various request in the PDU session establishment procedure. Not being limited to this, even in a case of having performed exchange of various information and/or negotiation of various request in the registration procedure, each apparatus may perform exchange of various information and/or negotiation of various request in the PDU session establishment procedure.

Each apparatus may perform the PDU session establishment procedure in the registration procedure, or may perform the PDU session establishment procedure after completion of the registration procedure. In a case that the PDU session establishment procedure is performed in the registration procedure, the PDU session establishment request message may be included in the Registration request message and transmitted and/or received, and the PDU session establishment accept message may be included in the Registration accept message and transmitted and/or received, and the PDU session establishment complete message may be included in the Registration complete message and transmitted and/or received, and the PDU session establishment reject message may be included in the Registration reject message and transmitted and/or received. Furthermore, in a case that the PDU session establishment procedure is performed in the registration procedure, each apparatus may establish a PDU session, based on completion of the registration procedure, and may transition to the first state.

By the above-mentioned procedures, each apparatus completes the present procedure. Note that by transmitting and/or receiving each control message described in the present procedure, each apparatus involved in the present procedure may transmit and/or receive one or more pieces of identification information included in each control message, and may store each transmitted and/or received identification information as a context. Furthermore, each apparatus may transition to the first state, based on completion of the present procedure.

1.3.1. Overview of Registration Procedure

First, an overview of the registration procedure will be described. The registration procedure is a procedure initiated by the UE_A 10 to connect with a network (an access network, and/or the core network_B 190, and/or the PDN_A 5). In a case of a state in which the UE_A 10 is not connected to the network, the UE_A 10 can perform the present procedure at any timing such as at terminal power activation. In other words, the UE_A 10 may initiate the present procedure at any timing in a case of being in a deregistered state (RM-DEREGISTERED). Each apparatus may transition to a registered state (RM-REGISTERED), based on completion of the registration procedure.

Furthermore, the present procedure may be a procedure to update location registration information of the UE_A 10 in the network, and/or to periodically notify a state of the UE_A 10 from the UE_A 10 to the network, and/or to update particular parameters related to the UE_A 10 in the network.

The UE_A 10 may initiate the present procedure in a case that mobility is made across a TA. In other words, the UE_A 10 may initiate the present procedure in a case of entering a TA different from the TAs indicated by a TA list held. Furthermore, the UE_A 10 may initiate the present procedure in a case that the timer being performed expires. Furthermore, the UE_A 10 may initiate the present procedure in a case that updating the contexts of each apparatus is required due to disconnection or disabling of the PDU session and/or EPS bearer. Furthermore, the UE_A 10 may initiate the present procedure in a case that a change occurs in the capability information and/or preferences for the PDU session establishment of the UE_A 10. Furthermore, the UE_A 10 may initiate the present procedure periodically. Note that no being limited to this, in a case of a state in which a PDU session is established, the UE_A 10 can perform the present procedure at any timing.

1.3.1.1. Example of Registration Procedure

Figure 15:
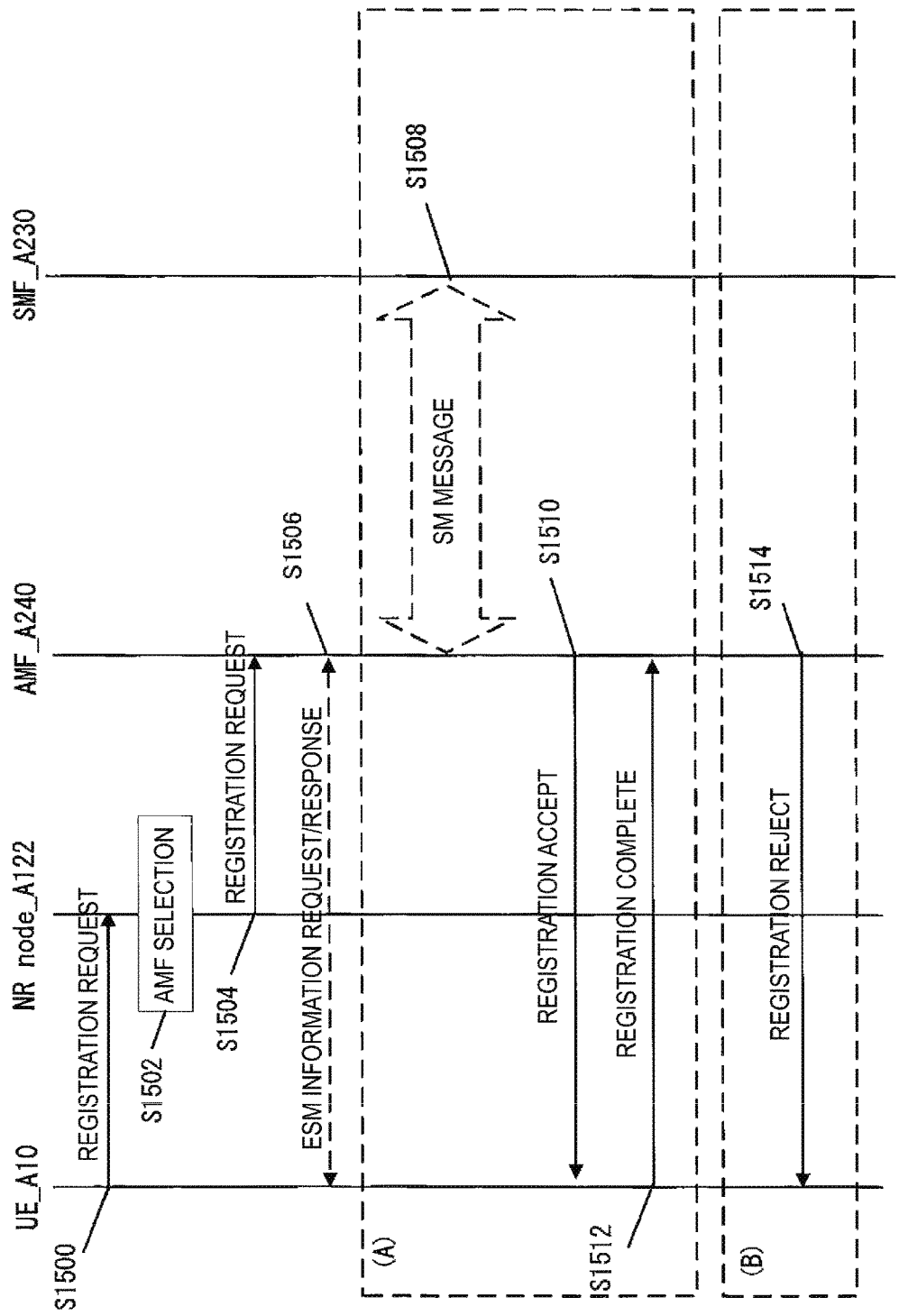
FIG. 15 is a diagram illustrating a registration procedure.

With reference to FIG. 15, an example of procedures to perform the registration procedure will be described. Hereinafter, the present procedure refers to the registration procedure. As follows, each step of the present procedure will be described. At first, the UE_A 10 transmits a Registration request message to the AMF_A 240 through the NR node_A 122 (S1500) (S1502) (S1504) to initiate the registration procedure. The UE_A 10 may transmit the Registration request message including the Session Management (SM) message, or by including the SM message, the UE_A 10 may request performance of the procedure for session management such as the PDU session establishment procedure during the registration procedure.

Specifically, the UE_A 10 transmits a RRC message including the Registration request message to the NR node_A 122 (S1500), and the NR node_A 122 having received the RRC message including the Registration request message selects the AMF_A 240 as the NF or the common CP function of the route destination of the Registration request message (S1502) and transmits the Registration request message to the selected AMF_A 240 (S1504). Here, the NR node_A 122 may select the AMF_A 240 of the routing destination, based on the information included in the RRC message. The Registration request message may be a Non-Access-Stratum (NAS) message transmitted and/or received over the N1 interface. Furthermore, the RRC message may be a control message transmitted and/or received between the UE_A 10 and the NR node_A 122.

Note that the UEA10 may transmit one or more Registration request messages present for each NSI requesting connection in one RRC message, or multiple Registration request messages may be collectively referred to as a Registration request message. Alternatively, for each NSI requesting a connection, the UE_A 10 may transmit the RRC messages including respective Registration request messages.

Here, the UE_A 10 may include at least the first identification information in the Registration request message and/or the RRC message, or including these pieces of identification information may indicate the request of the UE_A 10.

Furthermore, the UE_A 10 may indicate that the UE_A 10 supports and/or allows the connection to the second DN, or may indicate that the UE_A 10 supports and/or allows establishment of the PDU session connected to the second DN, by transmitting the first identification information.

Note that the UE_A 10 may determine whether or not the first identification information is included in the Registration request message, based on the UE_A 10 capability information, and/or policy such as the UE policy, and/or the UE_A 10 preferences. Note that the UE_A 10 determination of whether or not the first identification information is included in the Registration request message is not limited to this.

Furthermore, the UE_A 10 may transmit these pieces of identification information included in a control message different from the Registration request message to transmit. For example, the UE_A 10 may transmit these pieces of identification information included in the EPS Session Management (ESM) information response message (S1506), which is a response message to the ESM informational request message.

The AMF_A 240 receives the Registration request message and/or the control message different from the Registration request message, and performs the first condition determination. The first condition determination is intended to determine whether or not the network accepts the request of the UE_A 10. The AMF_A 240 initiates the procedure of (A) in the present procedure in a case that the first condition determination is true, and initiates the procedure of (B) in the present procedure in a case that the first condition determination is false.

As follows, each step of the procedure of (A) in the present procedure will be described. The AMF_A 240 performs the fourth condition determination, and initiates the procedure of (A) in the present procedure. The fourth condition determination is for determining whether or not the AMF_A 240 performs SM message transmission and/or reception with the SMF_A 230. The AMF_A 240 performs selection of the SMF_A 230 and SM message transmission and/or reception to and/or from the selected SMF_A 230 in a case that the fourth condition determination is true, and omits the process in a case that the fourth condition determination is false (S1508). Furthermore, the AMF_A 240 transmits the Registration accept message via the NR node_A 122 to the UE_A 10 (S1510), based on the receipt of the Registration request message and/or completion of SM message transmission and/or reception performed with the SMF_A 230. Note that in a case of having received an SM message indicating rejection, the AMF_A 240 may not continue the procedure of (A) in the present procedure, and may initiate the procedure of (B) in the present procedure. Here, the Registration accept message may be included in the control message of the N2 interface and the RRC message and transmitted and/or received. Furthermore, the Registration accept message may be a NAS message transmitted and/or received on the N1 interface. Moreover, the Registration accept message may be a response message to the Registration request message.

Furthermore, in a case that the fourth condition determination is true, the AMF_A 240 may transmit an SM such as the PDU session establishment accept message included in the Registration accept message and may indicate that the session management procedure has been accepted by including the SM message.

Here, the AMF_A 240 may include at least one or more pieces of identification information from the 11th identification information to the 14th identification information in the Registration accept message and may indicate that the request of the UE_A 10 has been accepted, by including these pieces of identification information.

Furthermore, the AMF_A 240 may indicate that the network supports and/or allows the connection to the second DN, or may indicate that the network supports and/or allows establishment of the PDU session connected to the second DN, by transmitting the 11th identification information.

Furthermore, the AMF_A 240 may indicate that a portion of the request of the UE_A 10 is rejected or not allowed, by transmitting the 12th identification information. For example, the AMF_A 240 may transmit the 12th identification information to indicate that establishment of the PDU session connecting to the second DN is temporarily prohibited, or indicate that modification of the connection destination of the established PDU session to the second DN is temporarily prohibited.

The AMF_A 240 may transmit the 12th identification information to indicate that establishment of the PDU session connecting to the second DN is prohibited in the cell and/or TA to which the UE_A 10 is currently connected, or to indicate that modification of the connection destination of the PDU session being established to the second DN is prohibited.

Furthermore, the AMF_A 240 may indicate that transmission of the PDU session establishment request message of the UE_A 10 is prohibited for a certain period of time, or may indicate a period in which transmission of the PDU session establishment request message is prohibited, by transmitting the 13th identification information. Furthermore, by transmitting the 13th identification information, the AMF_A 240 may indicate initiating the first timer or may indicate that the value indicated by the 13th identification information is configured as the value of the first timer.

Furthermore, the AMF_A 240 may transmit the 14th identification information to indicate a DN accessible by the UE_A 10. The AMF_A 240 may indicate a DN accessible as the second DN by the UE_A 10.

Note that the AMF_A 240 may determine which one of the 11th identification information to the 14th identification information to include in the Registration accept message, based on the received identification information and/or network capability information and/or policies such as the operator policy and/or the network status. Note that the AMF_A 240 determination of which identification information is included in the Registration accept message is not limited to this.

The UE_A 10 receives the Registration accept message and further transmits a Registration complete message to the AMF_A 240 (S1512). Note that in a case of having received an SM message such as the PDU session establishment accept message, the UE_A 10 may transmit an SM message such as the PDU session establishment complete message included in the Registration complete message and may indicate completing a session management procedure, by including the SM message. Here, the Registration complete message may be a NAS message transmitted and/or received over the N1 interface. The Registration complete message may also be a response message to the Registration accept message. Furthermore, the Registration complete message may be included in the RRC message and the control message of the N2 interface and transmitted and/or received.

The AMF_A 240 receives the Registration complete message. Each apparatus completes the procedure of (A) of the present procedure, based on transmission and/or reception of the Registration accept message and/or Registration complete message.

Each step of the procedure of (B) in the present procedure will now be described. The AMF_A 240 transmits a Registration reject message to the UE_A 10 through the NR node_A 122 (S1514), and initiates the procedure of (B) in the present procedure. Furthermore, the UE_A 10 receives the Registration reject message, and recognizes that the request of the UE_A 10 has been rejected. Each apparatus completes the procedure of (B) in the present procedure, based on transmission and/or reception of the Registration reject message. Note that, in a case that the fourth condition determination is true, the AMF_A 240 may transmit an SM message meaning rejection such as the PDU session establishment reject message included in the Registration reject message and may indicate that the session management procedure has been rejected by including the SM message meaning rejection. In that case, in addition, the UE_A 10 may receive an SM meaning rejection such as the PDU session establishment reject message, or may authenticate that a session management procedure has been rejected.

Furthermore, the Registration reject message may be a NAS message transmitted and/or received over the N1 interface. The Registration reject message may be a response message to the Registration request message but not limited to this, and may be a message to reject the request of the UE_A 10. Furthermore, the Registration reject message may be included in the control message of the N2 interface and the RRC message and transmitted and/or received.

The AMF_A 240 may include at least one or more pieces of identification information from the 21st identification information to the 22nd identification information in the Registration reject message and may indicate that the request of the UE_A 10 has been rejected, by including these pieces of identification information.

Furthermore, the AMF_A 240 may indicate that the request of the UE_A 10 is rejected or not allowed, by transmitting the 21st identification information. For example, the AMF_A 240 may transmit the 21st identification information to indicate that the connection to the second DN is temporarily prohibited, or to indicate that the connection to the second DN is prohibited in the cell and/or TA to which the UE_A 10 is currently connected.

Furthermore, the AMF_A 240 may indicate that retransmitting the UE_A 10 Registration request message is prohibited for a period of time, or may indicate a certain period of time during which retransmission of the Registration request message is prohibited, by transmitting the 21st identification information and/or the 22nd identification information. Furthermore, by transmitting the 22nd identification information, the AMF_A 240 may indicate initiating the second timer or may indicate that the value indicated by the 22nd identification information is configured as the value of the second timer.

Note that the AMF_A 240 may determine which of the identification information from the 21st identification information to the 22nd identification information is included in the Registration reject message, based on the received identification information and/or network capability information and/or policies such as the operator policy and/or the network status. Note that the AMF_A 240 determination of which identification information is included in the Registration reject message is not limited to this.

Each apparatus completes the present procedure, based on completion of the procedures of (A) or (B) of the present procedure. Note that each apparatus may transition to a state where the UE_A 10 is connected with the network and/or a registered state, based on completion of the procedure of (A) in the present procedure, may recognize that the present procedure has been rejected, based on completion of the procedure of (B) in the present procedure, or may transition to a state in which a connection to the network is not possible. Transition to each state of each apparatus may be performed based on completion of the present procedure, or may be performed based on an establishment of a PDU session.

Furthermore, each apparatus may perform processes based on identification information transmitted and/or received in the present procedure, based on completion of the present procedure. For example, the UE_A 10 may authenticate that the connection to the second DN is allowed and/or supported in a case of having received the 11th identification information. Furthermore, the UE_A 10 may initiate the PDU session establishment procedure performed to establish the PDU session to connect to the second DN in a case that the 11th identification information is received.

The UE_A 10 may also recognize that some functions are limited in a case of having received the 12th identification information and/or the 13th identification information. For example, in a case that the 12th identification information is received, the UE_A 10 may be prohibited from initiating the PDU session establishment procedure performed to establish the PDU session connecting to the second DN in the currently connected cell and/or TA, or the UE_A 10 may be prohibited from transmitting the PDU session establishment request message indicating request for establishment of the PDU session connecting to the second DN in the currently connected cell and/or TA.

Furthermore, in a case of having received the 12th identification information and/or the 13th identification information, the UE_A 10 may be temporarily prohibited from initiating the PDU session establishment procedure performed to establish the PDU session connecting to the second DN, or may be temporarily prohibited from transmitting the PDU session establishment request message indicating a request for establishment of the PDU session connecting to the second DN.

Furthermore, in a case that the UE_A 10 receives the 12th identification information and/or the 13th identification information, the UE_A 10 may configure the value indicated by the 13th identification information as the value of the first timer, or may initiate performance of the first timer. Furthermore, the UE_A 10 may be prohibited from initiating the PDU session establishment procedure performed to establish the PDU session to connect to the second DN until the first timer expires, or may be prohibited from transmitting the PDU session establishment request message indicating a request for establishment of the PDU session to connect to the second DN until the first timer expires.

Furthermore, in a case that the UE_A 10 receives the Registration accept message including the 12th identification information and/or the 13th identification information, the UE_A 10 may not initiate the PDU session establishment procedure performed to establish the PDU session to connect to the second DN, or may not transmit the PDU session establishment request message indicating a request for establishment of the PDU session to connect to the second DN. In other words, in a case that the UE_A 10 receives the Registration accept message not including the 12th identification information and/or the 13th identification information, the UE_A 10 may initiate the PDU session establishment procedure performed to establish the PDU session to connect to the second DN, or may transmit the PDU session establishment request message indicating a request for establishment of the PDU session to connect to the second DN.

Furthermore, in a case that the UE_A 10 receives the 14th identification information, after completion of the procedure, the UE_A 10 may initiate the PDU session establishment procedure performed to establish the PDU session connecting to the second DN, by using the DNN indicated by the 14th identification information, and after completion of the procedure, the UE_A 10 may transmit the PDU session establishment request message including the DNN indicated by the 14th identification information to the SMF_A 230 via the AMF_A 240.

In a case that the UE_A 10 receives the 21st identification information and/or the 22nd identification information, the UE_A 10 may recognize that the request of the UE_A 10 has been rejected, or may further recognize the reason why the request has been rejected.

For example, in a case that the 21st identification information is received, then the UE_A 10 may recognize that the network does not support connection to the second DN, or may recognize that the connection to the second DN is not allowed by the network. In other words, in a case of having received the 21st identification information, the UE_A 10 may be prohibited from initiating the PDU session establishment procedure performed to establish the PDU session connecting to the second DN, or may be prohibited from transmitting the PDU session establishment request message indicating a request for establishment of the PDU session connecting to the second DN.

Furthermore, in a case that the 21st identification information is received, the UE_A 10 may be prohibited from initiating a new registration procedure performed to connect to the second DN in the currently connected cell and/or TA, or may be prohibited from transmitting the Registration request message indicating a request to connect to the second DN in the currently connected cell and/or TA.

Furthermore, in a case that the UE_A 10 receives the 21st identification information and/or the 22nd identification information, the UE_A 10 may configure the value indicated by the 22nd identification information as the value of the second timer, or may initiate performance of the second timer. Furthermore, the UE_A 10 may be prohibited from initiating a new registration procedure performed to connect to the second DN until the second timer expires, or may be prohibited from transmitting Registration request message indicating a request to connect to the second DN until the second timer expires.

Furthermore, in a case that the Registration reject message including the 21st identification information and/or the 22nd identification information is received, the UE_A 10 may not initiate a new registration procedure performed to connect to the second DN, or may not transmit a new Registration request message indicating a request to connect to the second DN. In other words, in a case that the Registration accept message not including the 21st identification information and/or the 22nd identification information is received, the UE_A 10 may initiate a new registration procedure performed to connect to the second DN, or may transmit a new Registration request message indicating a request to connect to the second DN.

Furthermore, in a case that the UE_A 10 receives one or more pieces of identification information from the 11th identification information to the 14th identification information, the UE_A 10 may store, in the context which the UE_A 10 holds, information indicated by each piece of identification information received with the Registration accept message. Furthermore, in a case that the UE_A 10 receives one or more pieces of identification information from the 21st identification information to the 22nd identification information, the UE_A 10 may update or delete the information in the context which the UE_A 10 holds, or may further store information indicated by each piece of the identification information received with the Registration reject message in the context which the UE_A 10 holds.

In a case that the UE_A 10 receives the 12th identification information and/or the 22nd identification information, the UE_A 10 may recognize the reason why the request has been rejected. Furthermore, the UE_A 10 may perform the present procedure again, based on reasons why the request of the UE_A 10 has been rejected, or may perform the registration procedure for the core network_A 90 or another cell.

The first condition determination may be performed based on identification information, and/or subscriber information, and/or operator policies included in the Registration request message. For example, in a case that the network allows the request of the UE_A 10, the first condition determination may be true. In a case that the network does not allow the request of the UE_A 10, the first condition determination may be false. Furthermore, the first condition determination may be true in a case that the network to which the UE_A 10 is connected and/or an apparatus in the network supports functions requested by the UE_A 10, or may be false in a case that the network and/or the apparatus does not support functions requested by the UE_A 10. Note that conditions that true or false of the first condition determination is determined may not be limited to the previously described conditions.

The fourth condition determination may be performed, based on whether or not the AMF_A 240 has received an SM, or may be performed, based on whether or not an SM message is included in the Registration request. For example, the fourth condition determination may be true in a case that the AMF_A 240 received an SM and/or an SM message is included in the Registration request, or may be false in a case that the AMF_A 240 has not received an SM and/or an SM message is not included in the Registration request. Note that conditions that true or false of the fourth condition determination is determined may not be limited to the previously described conditions.

1.3.2. Overview of PDU Session Establishment Procedure

An overview of a PDU session establishment procedure will now be described. As follows, the present procedure refers to the PDU session establishment procedure. The present procedure is a procedure for each apparatus to establish a PDU session. Note that each apparatus may perform the present procedure in a state after completing the registration procedure, or may perform the present procedure during the registration procedure. Each apparatus may initiate the present procedure in the registered state, or may initiate the present procedure at any timing after the registration procedure. Each apparatus may establish a PDU session, based on completion of the PDU session establishment procedure. Furthermore, each apparatus may establish multiple PDU sessions by performing the present procedure several times.

1.3.2.1. Example of PDU Session Establishment Procedure

Figure 16:
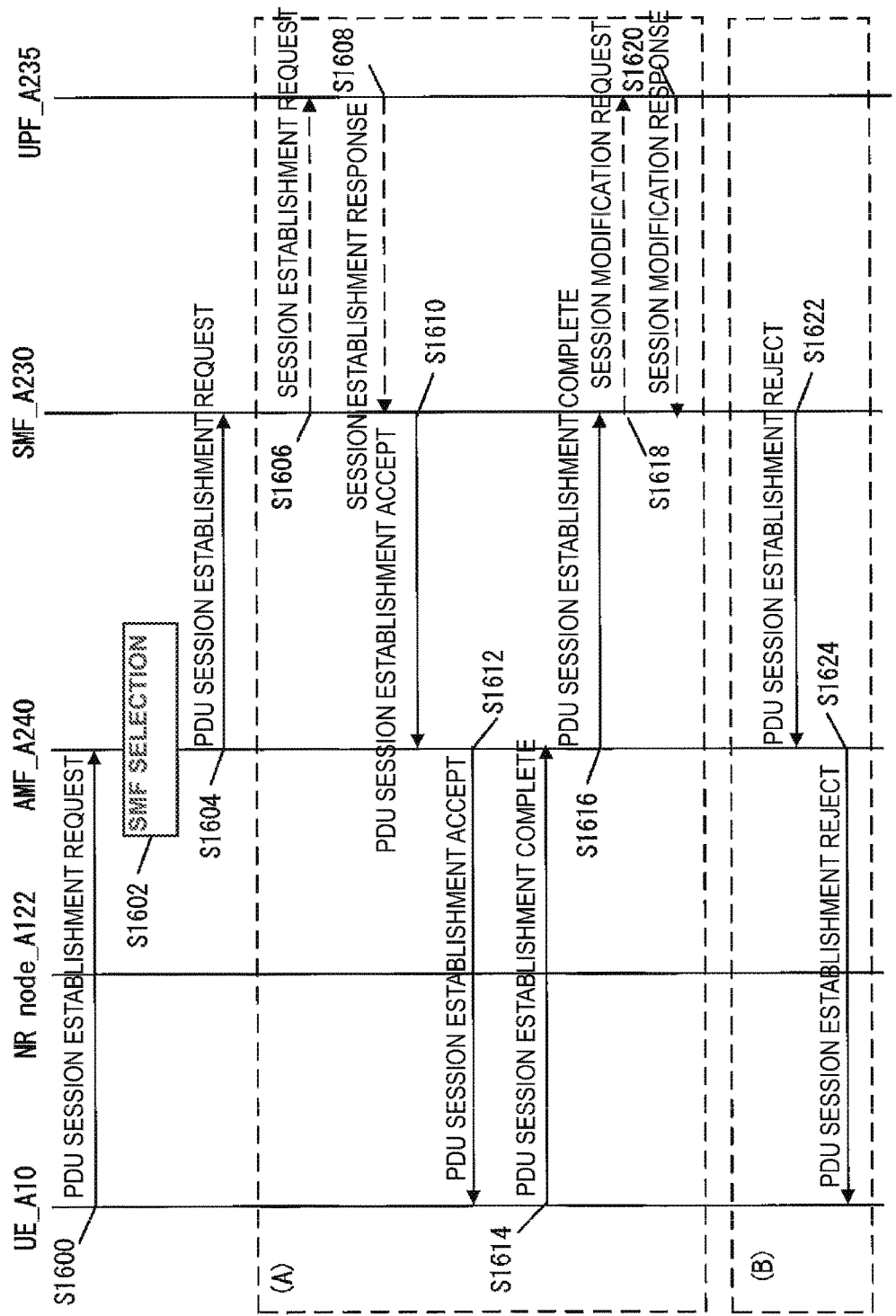
FIG. 16 is a diagram illustrating a PDU session establishment procedure.

With reference to FIG. 16, an example of a procedure to perform a PDU session establishment procedure will be described. As follows, each step of the present procedure will be described. First of all, the UE_A 10 transmits a PDU session establishment request message to the SMF_A 230 through the NR node_A 122 and the AMF_A 240 (S1600) (S1602) (S1604) and initiates a PDU session establishment procedure.

Specifically, the UE_A 10 transmits the PDU session establishment request message to the AMF_A 240 by using the N1 interface (S1600), and the AMF_A 240 having received the PDU session establishment request message selects the SMF_A 230 as the routing destination NF of the PDU session establishment request message (S1602), and transmits the PDU session establishment request message to the selected SMF_A 230 by using the N11 interface (S1604). Here, the AMF_A 240 may select the routing destination SMF_A 230, based on the information included in the PDU session establishment request message. More particularly, the AMF_A 240 may select the routing destination SMF_A 230, based on each piece of identification information obtained based on reception of the PDU session establishment request message, and/or subscriber information, and/or network capability information, and/or operator policy, and/or the state of the network, and/or the context which the AMF_A 240 already holds.

Note that in a case that the PDU session is PDN connection, the PDU session establishment request message may be a PDN connectivity request message. Furthermore, the PDU session establishment request message may be a NAS message transmitted and/received on the N1 interface and the N11 interface. The PDU session establishment request message is not limited to this, and may be a message to request an establishment of a PDU session.

Here, the UE_A 10 may include at least one or more pieces of identification information from the 31st identification information to the 35th identification information in the PDU session establishment request message and may indicate a request of the UE_A 10, by including these pieces of identification information.

Furthermore, the UE_A 10 may request establishment of the PDU session connected to the second DN, by transmitting one or more pieces of identification information from the 31st identification information to the 35th identification information. More particularly, by transmitting the 32nd identification information and/or associating the 31st identification information and the 32nd identification information to transmit, the UE_A 10 may request to establish the PDU session to connect to the second DN, or may further request for the PDU session connection destination established to be the DN indicated by the 32nd identification information.

Furthermore, by transmitting the 33rd identification information and/or associating the 31st identification information and the 33rd identification information to transmit, the UE_A 10 may request to establish the PDU session identified by the PDU session ID indicated by the 33rd identification information, or may request for the established PDU session connection destination to be the second DN.

Furthermore, by transmitting the 34th identification information and/or associating the 31st identification information and the 34th identification information to transmit, the UE_A 10 may request to establish the PDU session to connect to the second DN, or may further request for the PDU session type of the PDU session established to be the PDU session type indicated by the 34th identification information.

Furthermore, by transmitting the 34th identification information and/or associating the 31st identification information and the 34th identification information to transmit, the UE_A 10 may request to make the address used in the user data communication performed on the second DN by using the PDU session established to be the address of the type indicated by the 34th identification information, or may further request to make the address used in the user data communication to be the address indicated by the 34th identification information.

Furthermore, by transmitting the 35th identification information and/or associating the 31st identification information and the 35th identification information to transmit, the UE_A 10 may request to establish the PDU session to connect to the second DN, or may further request for the TFT used in the user data communication performed on the second DN by using the PDU session established to be the TFT indicated by the 35th identification information.

Note that the UE_A 10 may determine which of the identification information from the 31st identification information to the 35th identification information is included in the PDU session establishment request message, based on the UE_A 10 capability information, and/or policy such as the UE policy, and/or the UE_A 10 preferences. Note that the determination by the UE_A 10 of which identification information is included in the PDU session establishment request message is not limited to this.

The SMF_A 230 receives the PDU session establishment request message, and performs the first condition determination. The first condition determination is intended to determine whether or not the SMF_A 230 accepts the request of the UE_A 10. In the first condition determination, the SMF_A 230 determines whether the first condition determination is true or false. The SMF_A 230 initiates the procedure of (A) in the present procedure in a case that the first condition determination is true, and initiates the procedure of (B) in the present procedure in a case that the first condition determination is false. Note that steps in a case that the first condition determination is false will be described later.

As follows, steps in a case that the first condition determination is true, in other words, each step of the procedure of (A) in the present procedure will be described. The SMF_A 230 selects the UPF_A 235 of the establishment destination of the PDU session, and transmits a Session Establishment request message to the selected UPF_A 235 (S1606), and initiates the procedure of (A) in the present procedure.

Here, the SMF_A 230 may select one or more UPF_A 235, based on each piece of identification information obtained based on reception of the PDU session establishment request message, and/or network capability information, and/or subscriber information, and/or operator policy, and/or the state of the network, and/or the context which the SMF_A 230 already holds. Note that in a case that multiple UPF_A 235 are selected, the SMF_A 230 may transmit the session establishment request message to each UPF_A 235.

The UPF_A 235 receives the session establishment request message and creates a context for the PDU session. Furthermore, the UPF_A 235 transmits a Session Establishment response message to the SMF_A 230 (S1608), based on reception of the session establishment request message and/or creation of the context for the PDU session. Furthermore, the SMF_A 230 receives the session establishment response message. Note that the session establishment request message and the session establishment response message may be control messages transmitted and/or received over the N4 interface. Furthermore, the session establishment response message may be a response message to the session establishment request message.

Furthermore, the SMF_A 230 may perform address allocation of the address allocated to the UE_A 10, based on the reception of the PDU session establishment request message, and/or the selection of the UPF_A 235, and/or the reception of the session establishment response message. Furthermore, the SMF_A 230 may associate the address allocated to the UE_A 10 and information indicating that the address is to be used for communication to the second DN with each other. Note that the SMF_A 230 may perform address allocation of the address allocated to the UE_A 10 during the PDU session establishment procedure, or may perform the address allocation after the PDU session establishment procedure is complete.

Specifically, in a case that the SMF_A 230 allocates an IPv4 address without using DHCPv4, the SMF_A 230 may perform address allocation during the PDU session establishment procedure, or may transmit the allocated address to the UE_A 10. Furthermore, in a case that the SMF_A 230 uses DHCPv4 or DHCPv6 or Stateless Address Autoconfiguration (SLAAC) to allocate an IPv4 address and/or an IPv6 address and/or an IPv6 prefix, the SMF_A 230 may perform address allocation after the PDU session establishment procedure, or may transmit the allocated address to the UE_A 10. Note that the address allocation performed by the SMF_A 230 is not limited to these.

Furthermore, based on the completion of the address allocation of the address allocated to the UE_A 10, the SMF_A 230 may transmit the allocated address to the UE_A 10 included the 44th identification information, or may transmit by associating information indicating the allocated address and information indicating whether the allocated address is an address that can be used for the user data communication performed between the allocated address and second DN, without being included the 44th identification information. In this case, the UE_A 10 may receive the 44th identification information, and/or information indicating the allocated address, and/or information indicating whether the allocated address is an address that can be used for user data communication performed with the second DN, transmitted by the SMF_A 230.

The SMF_A 230 transmits a PDU session establishment accept message to the UE_A 10 via the AMF_A 240 (S1610) (S1612), based on the reception of the PDU session establishment request message, and/or selection of the UPF_A 235, and/or the reception of the session establishment response message, and/or completion of the address allocation of the address allocated to the UE_A 10.

Specifically, the SMF_A 230 transmits the PDU session establishment accept message to the AMF_A 240 by using the N11 interface (S1610), and the AMF_A 240 having received the PDU session establishment request message transmits the PDU session establishment accept message to the UE_A 10 by using the N1 interface (S1612).

Note that in a case that the PDU session is PDN connection, the PDU session establishment accept message may be a PDN connectivity accept message. Furthermore, the PDU session establishment accept message may be a NAS message transmitted and/received over the N11 interface and the N1 interface. The PDU session establishment accept message is not limited to this, and may be a message indicating that establishment of the PDU session has been accepted.

Here, the SMF_A 230 may include at least one or more pieces of identification information from the 41st identification information to the 45th identification information in the PDU session establishment accept message and may indicate that the request of the UE_A 10 has been accepted, by including these pieces of identification information.

Furthermore, by transmitting one or more pieces of identification information from the 41st identification information to the 45th identification information, the SMF_A 230 may indicate that the network has accepted the request for establishment of the PDU session to connect to the second DN, or may indicate that the network has accepted establishment of the PDU session to connect to the second DN. More specifically, by transmitting the 42nd identification information and/or associating the 41st identification information and the 42nd identification information to transmit, the SMF_A 230 may indicate that the PDU session to connect to the second DN is established, or may indicate that the connection destination of the established PDU session is the DN indicated by the 42nd identification information.

Furthermore, by transmitting the 43rd identification information and/or associating the 41st identification information and the 43rd identification information to transmit, the SMF_A 230 may indicate that the PDU session identified by the PDU session ID indicated by the 43rd identification information is established, or may indicate that the connection destination of the established PDU session is the second DN.

Furthermore, by transmitting the 44th identification information and/or associating the 41st identification information and the 44th identification information to transmit, the SMF_A 230 may indicate that the PDU session to connect to the second DN is established, or may indicate that the address used in the user data communication performed for the second UN by using the established PDU session is the address of the PDU session type indicated by the 44th identification information and/or the address indicated by the 44th identification information.

Furthermore, by transmitting the 45th identification information and/or associating the 41st identification information and the 45th identification information to transmit, the SMF_A 230 may indicate that the PDU session to connect to the second DN is established, or may indicate that the TFT used in the user data communication performed for the second DN by using the established PDU session is the TFT indicated by the 45th identification information.

Note that the SMF_A 230 may determine which one of the 41st identification information to the 45th identification information to include in the PDU session establishment accept message, based on the received identification information, and/or network capability information, and/or policies such as operator policy, and/or the network status. Note that the determination by the SMF_A 230 of which identification information is included in the PDU session establishment accept message is not limited to this.

The UE_A 10 receives the PDU session establishment accept message, and further transmits a PDU session establishment complete message to the SMF_A 230 through the AMF_A 240 (S1614) (S1616). Furthermore, the SMF_A 230 receives the PDU session establishment complete message, and performs the second condition determination.

Specifically, the UE_A 10 transmits the PDU session establishment complete message to the AMF_A 240 by using the N1 interface (S1614), and the AMF_A 240 having received the PDU session establishment complete message transmits the PDU session establishment complete message to the SMF_A 230 by using the NH interface (S1616).

Note that in a case that the PDU session is PDN connection, the PDU session establishment complete message may be a PDN Connectivity complete message, or may be an Activate default EPS bearer context accept message. Furthermore, the PDU session establishment complete message may be a NAS message transmitted and/received over the N1 interface and the N11 interface. A PDU session establishment complete message may be a response message to a PDU session establishment accept message but not limited to this, and may be a message to indicate that a PDU session establishment procedure will be completed.

The second condition determination is for determining a type of the message on the N4 interface to be transmitted and/or received. In a case that the second condition determination is true, the SMF_A 230 transmits a Session Modification request message to the UPF_A 235 (S1618), and further receives a Session Modification response message transmitted by the UPF_A 235 having received the session modification request message (S1620). In a case that the second condition determination is false, the SMF_A 230 transmits a session establishment request message to the UPF_A 235 (S1618), and further receives a session modification accept message transmitted by the UPF_A 235 that has received the session establishment request message (S1620). Each apparatus completes the procedure of (A) in the present procedure, based on transmission and/or reception of the PDU session establishment complete message, and/or transmission and/or reception of the session modification response message, and/or transmission and/or reception of the session establishment response message.

Each step of the procedure of (B) in the present procedure will now be described. The SMF_A 230 transmits a PDU session establishment reject message to the UE_A 10 through the AMF_A 240 (S1622) (S1624), and initiates the procedure of (B) in the present procedure.

Specifically, the SMF_A 230 transmits the PDU session establishment reject message to the AMF_A 240 by using the N11 interface (S1622), and the AMF_A 240 having received the PDU session establishment request message transmits the PDU session establishment reject message to the UE_A 10 by using the N1 interface (S1624).

Note that in a case that the PDU session is PDN connection, the PDU session establishment reject message may be a PDN connectivity reject message. Furthermore, the PDU session establishment reject message may be a NAS message transmitted and/received on the N11 interface and the N1 interface. The PDU session establishment reject message is not limited to this, and may be a message indicating that establishment of the PDU session has been rejected.

Here, the SMF_A 230 may include at least one or more pieces of identification information from the 51st identification information to the 56th identification information in the PDU session establishment reject message and may indicate that the request of the UE_A 10 has been rejected, by including these pieces of identification information.

Furthermore, by transmitting one or more pieces of identification information from the 51st identification information to the 56th identification information, the SMF_A 230 may indicate that the network has rejected the request for establishment of the PDU session to connect to the second DN, or may indicate that the network has not accepted establishment of the PDU session to connect to the second DN. Furthermore, the SMF_A 230 may transmit one or more pieces of identification information from the 51st identification information to the 56th identification information to indicate that the PDU session that connects to the second DN has not been established.

For example, the SMF_A 230 may transmit the 51st identification information to indicate that the connection to the second DN is temporarily prohibited, or to indicate that the connection to the second DN is prohibited in the cell and/or TA to which the UE_A 10 is currently connected.

Furthermore, by transmitting the 52nd identification information, the SMF_A 230 may indicate that the DNN indicated by the 32nd identification information is inappropriate in establishing the PDU session connecting to the second DN, or may indicate that the DNN indicated by the 32nd identification information is not the DNN indicating the second DN.

Furthermore, by transmitting the 53rd identification information, the SMF_A 230 may indicate that the PDU session ID indicated by the 33rd identification information is inappropriate in establishing the PDU session connecting to the second DN, may indicate that the PDU session identified by the PDU session ID indicated by the 33rd identification information cannot be established for the second DN, or may indicate that the PDU session ID indicated by the 33rd identification information cannot be used for the PDU session that connects to the second DN.

Furthermore, by transmitting the 54th identification information, the SMF_A 230 may indicate that the PDU session type and/or address indicated by the 34th identification information is inappropriate in establishing the PDU session that connects to the second DN, or may indicate that the address of the PDU session type indicated by the 34th identification information and/or the address indicated by the 34th identification information cannot be used for the user data communication performed on the second DN.

Furthermore, by transmitting the 55th identification information, the SMF_A 230 may indicate that the TFT indicated by the 35th identification information is inappropriate in establishing the PDU session connecting to the second DN, or may indicate that the TFT indicated by the 35th identification information cannot be used for the user data communication performed on the second DN.

Furthermore, the SMF_A 230 may indicate that retransmission of the PDU session establishment request message of the UE_A 10 is prohibited for a certain period of time, or may indicate a period in which retransmission of the PDU session establishment request message is prohibited, by transmitting the 51st identification information and/or the 56th identification information. Furthermore, by transmitting the 56th identification information, the SMF_A 230 may indicate initiating the first timer or may indicate that the value indicated by the 56th identification information is configured as the value of the first timer.

Note that the SMF_A 230 may determine which one of the 51st identification information to the 56th identification information to include in the PDU session establishment reject message, based on the received identification information, and/or network capability information, and/or policies such as operator policy, and/or the network status. Note that the determination by the SMF_A 230 of which identification information is included in the PDU session establishment reject message is not limited to this.

Each apparatus completes the present procedure, based on completion of the procedures of (A) or (B) of the present procedure. Note that each apparatus may transition to a state where a PDU session has been established, based on completion of the procedure of (A) in the present procedure, may recognize that the present procedure has been rejected, based on completion of the procedure of (B) in the present procedure, or may transition to a state where a PDU session is not established.

Furthermore, each apparatus may perform processes based on identification information transmitted and/or received in the present procedure, based on completion of the present procedure. For example, in a case that one or more pieces of identification information from the 41st identification information to the 45th identification information is received, the UE_A 10 may authenticate that the PDU session connected to the second DN has been established, or may authenticate that the user data communication can be performed to the second DN by using the PDU session established.

Furthermore, the UE_A 10 may recognize that the DN identified by the 42nd identification information is the second DN, based on the reception of the 41st identification information and/or the 42nd identification information. Furthermore, the UE_A 10 may recognize that the PDU session identified by the 43rd identification information is the PDU session that can be used in performing the user data communication to the second DN, based on the reception of the 41st identification information and/or the 43rd identification information.

Furthermore, the UE_A 10 may recognize that the address of the PDU session type identified by the 44th identification information, and/or the address identified by the 44th identification information is an address that can be used in performing the user data communication to the second DN, based on the reception of the 41st identification information and/or the 44th identification information. Furthermore, the UE_A 10 may recognize that the TFT identified by the 45th identification information is a TFT that can be used in performing the user data communication to the second DN, based on the reception of the 41st identification information and/or the 45th identification information.

Furthermore, the UE_A 10 may use the PDU session identified by the 43rd identification information, may use the address of the PDU session type identified by the 44th identification information, may use the address identified by the 44th identification information, or may use the TFT identified by the 45th identification information, in performing the user data communication for the second DN.

In other words, in a case that the UE_A 10 receives one or more pieces of identification information from the 41st identification information to the 45th identification information, the UE_A 10 may perform the user data communication for the DN identified by the 42nd identification information, may perform the user data communication for the second DN by using the PDU session identified by the 43rd identification information, may perform the user data communication for the second DN by using the address of the PDU session type identified by the 44th identification information and/or the address identified by the 44th identification information, or may perform the user data communication for the second DN by using the TFT identified by the 45th identification information, after completion of the procedure.

In a case that the UE_A 10 receives one or more pieces of identification information from the 51st identification information to the 56th identification information, the UE_A 10 may recognize that the request of the UE_A 10 has been rejected, or may further recognize the reason why the request has been rejected. Furthermore, the UE_A 10 may perform the present procedure again, based on reasons why the request has been rejected, or may perform the registration procedure for another cell or TA.

For example, in a case that the 51st identification information is received, the UE_A 10 may recognize that the PDU session to connect to the second DN is not established, or may recognize that the PDU session connected to the second DN is not allowed to be established.

Furthermore, in a case that the 51st identification information is received, then the UE_A 10 may recognize that the PDU session connecting to the second DN is prohibited in the currently connected cell and/or TA. Furthermore, in a case that the 51st identification information is received, the UE_A 10 may be prohibited from initiating a new PDU session establishment procedure performed to establish the PDU session connecting to the second DN in the currently connected cell and/or TA, or the UE_A 10 may be prohibited from transmitting the PDU session establishment request message indicating request for establishment of the PDU session connecting to the second DN in the currently connected cell and/or TA.

Furthermore, in a case that the PDU session establishment reject message including the 51st identification information is received, the UE_A 10 may not initiate a new PDU session establishment procedure performed to establish the PDU session connecting to the second DN in the currently connected cell and/or TA, or the UE_A 10 may not transmit a new PDU session establishment request message indicating request for establishment of the PDU session connecting to the second DN in the currently connected cell and/or TA. In other words, in a case that the PDU session establishment reject message not including the 51st identification information is received, the UE_A 10 may initiate a new PDU session establishment procedure performed to establish the PDU session connecting to the second DN in the currently connected cell and/or TA, or the UE_A 10 may transmit a new PDU session establishment request message indicating request for establishment of the PDU session connecting to the second DN in the currently connected cell and/or TA.

Furthermore, in a case that the 52nd identification information is received, then the UE_A 10 may recognize that establishment of the PDU session using the DNN indicated by the 32nd identification information is prohibited. Furthermore, in a case that the 52nd identification information is received, the UE_A 10 may be prohibited from initiating a new PDU session establishment procedure using identification information indicating the same DNN as the 32nd identification information, or may be prohibited from transmitting a new PDU session establishment request message including identification information indicating the same DNN as the 32nd identification information.

Furthermore, in a case of having received the PDU session establishment reject message including the 52nd identification information, the UE_A 10 may not initiate a new PDU session establishment procedure using identification information indicating the same DNN as the 32nd identification information, or may not transmit a new PDU session establishment request message including identification information indicating the same DNN as the 32nd identification information. In other words, in a case of having received the PDU session establishment reject message not including the 52nd identification information, the UE_A 10 may initiate a new PDU session establishment procedure using identification information indicating the same DNN as the 32nd identification information, or may transmit a new PDU session establishment request message including identification information indicating the same DNN as the 32nd identification information.

Furthermore, in a case that the 53rd identification information is received, the UE_A 10 may recognize that establishment of the PDU session using the PDU session ID indicated by the 33rd identification information is prohibited. Furthermore, in a case that the 53rd identification information is received, the UE_A 10 may be prohibited from initiating a new PDU session establishment procedure using identification information indicating the same PDU session ID as the 33rd identification information, or may be prohibited from transmitting a new PDU session establishment request message including identification information indicating the same PDU session ID as the 33rd identification information.

Furthermore, in a case of having received the PDU session establishment reject message including the 53rd identification information, the UE_A 10 may not initiate a new PDU session establishment procedure using identification information indicating the same PDU session ID as the 33rd identification information, or may not transmit a new PDU session establishment request message including identification information indicating the same PDU session ID as the 33rd identification information. In other words, in a case of having received the PDU session establishment reject message not including the 53rd identification information, the UE_A 10 may initiate a new PDU session establishment procedure using identification information indicating the same PDU session ID as the 33rd identification information, or may transmit a new PDU session establishment request message including identification information indicating the same PDU session ID as the 33rd identification information.

Furthermore, in a case that the 54th identification information is received, then the UE_A 10 may recognize that establishment of the PDU session using the PDU session type and/or address indicated by the 34th identification information is prohibited. Furthermore, in a case that the 54th identification information is received, the UE_A 10 may be prohibited from initiating a new PDU session establishment procedure using identification information indicating the same PDU session type and/or address as the 34th identification information, or may be prohibited from transmitting a new PDU session establishment request message including identification information indicating the same PDU session type and/or address as the 34th identification information.

Furthermore, in a case of having received the PDU session establishment reject message including the 54th identification information, the UE_A 10 may not initiate a new PDU session establishment procedure using identification information indicating the same PDU session type and/or address as the 34th identification information, or may not transmit a new PDU session establishment request message including identification information indicating the same PDU session type and/or address as the 34th identification information. In other words, in a case of having received the PDU session establishment reject message not including the 54th identification information, the UE_A 10 may initiate a new PDU session establishment procedure using identification information indicating the same PDU session type and/or address as the 34th identification information, or may transmit a new PDU session establishment request message including identification information indicating the same PDU session type and/or address as the 34th identification information.

Furthermore, in a case that the 55th identification information is received, then the UE_A 10 may recognize that establishment of the PDU session using the TFT indicated by the 35th identification information is prohibited. Furthermore, in a case that the 55th identification information is received, the UE_A 10 may be prohibited from initiating a new PDU session establishment procedure using identification information indicating the same TFT as the 35th identification information, or may be prohibited from transmitting a new PDU session establishment request message including identification information indicating the same TFT as the 35th identification information.

Furthermore, in a case of having received the PDU session establishment reject message including the 55th identification information, the UE_A 10 may not initiate a new PDU session establishment procedure using identification information indicating the same TFT as the 35th identification information, or may not transmit a new PDU session establishment request message including identification information indicating the same TFT as the 35th identification information. In other words, in a case of having received the PDU session establishment reject message not including the 55th identification information, the UE_A 10 may initiate a new PDU session establishment procedure using identification information indicating the same TFT as the 35th identification information, or may transmit a new PDU session establishment request message including identification information indicating the same TFT as the 35th identification information.

Furthermore, in a case of having received the 51st identification information and/or the 56th identification information, the UE_A 10 may recognize that establishment of the PDU session connecting to the second DN is temporarily prohibited. Furthermore, in a case of having received the 51st identification information and/or the 56th identification information, the UE_A 10 may be temporarily prohibited from initiating a new PDU session establishment procedure performed to establish the PDU session connecting to the second DN, or may be temporarily prohibited from transmitting the PDU session establishment request message indicating a request for establishment of the PDU session connecting to the second DN.

Furthermore, in a case that the UE_A 10 receives the 56th identification information, the UE_A 10 may configure the value indicated by the 56th identification information as the value of the first timer, or may initiate performance of the first timer. Furthermore, the UE_A 10 may be prohibited from initiating a new PDU session establishment procedure performed to establish the PDU session to connect to the second DN until the first timer expires, or may be prohibited from transmitting the PDU session establishment request message indicating a request for establishment of the PDU session to connect to the second DN until the first timer expires.

Furthermore, in a case that the UE_A 10 receives the PDU session establishment reject message including one or more pieces of identification information from the 51st identification information to the 56th identification information, the UE_A 10 may not initiate a new PDU session establishment procedure performed to establish the PDU session to connect to the second DN, or may not transmit a new PDU session establishment request message indicating a request for establishment of the PDU session to connect to the second DN. In other words, in a case that the UE_A 10 receives the PDU session establishment reject message not including one or more pieces of identification information from the 51st identification information to the 56th identification information, the UE_A 10 may initiate a new PDU session establishment procedure performed to establish the PDU session to connect to the second DN, or may transmit a new PDU session establishment request message indicating a request for establishment of the PDU session to connect to the second DN.

Furthermore, in a case that the UE_A 10 receives one or more pieces of identification information from the 41st identification information to the 45th identification information, the UE_A 10 may store, in the context which the UE_A 10 holds, information indicated by each piece of identification information received with the PDU session establishment accept message. Furthermore, in a case that the UE_A 10 receives one or more pieces of identification information from the 51st identification information to the 56th identification information, the UE_A 10 may update or delete the information in the context which the UE_A 10 holds, or may further store information indicated by each piece of the identification information received with the PDU session establishment reject message in the context which the UE_A 10 holds.

Furthermore, the UE_A 10 may transition to the first state, may transition to the state in which the PDU session is established, or may transition to a normal state, based on reception of the PDU session establishment accept message, and/or reception of each piece of identification information that is included in the PDU session establishment accept message. Note that the normal state may be a state to transition to in a case that the procedure is completed successfully. Furthermore, the normal state may be a state in which the PDU session requested by the UE_A 10 has been established. Note that, states to transition to based on the completion of the present procedure are not limited to these states.

Furthermore, the UE_A 10 may transition to the state in which the PIM session is not established, or may transition to an abnormal state, based on reception of the PDU session establishment reject message, and/or reception of each piece of identification information that is included in the PDU session establishment reject message. Note that the abnormal state may be a state to transition to in a case that the procedure is not completed successfully. Furthermore, the abnormal state may be a state in which the PDU session requested by the UE_A 10 has not been established. Note that, states to transition to based on the completion of the present procedure are not limited to these states.

Furthermore, the AMF_A 240 and/or the SMF_A 230 may cause the state associated with the UE_A 10 to transition to the first state, the state in which the PDU session is established, or a normal state, based on transmission of the PDU session establishment accept message, and/or transmission of each piece of identification information that is included in the PDU session establishment accept message. Note that, states to which the states associated with the UE_A 10 transition based on the completion of the present procedure are not limited to these states.

Furthermore, the AMF_A 240 and/or the SMF_A 230 may transition the state associated with the UE_A 10 to the state in which the PDU session is not established, or may transition to an abnormal state, based on transmission of the PDU session establishment reject message, and/or transmission of each piece of identification information that is included in the PDU session establishment reject message. Note that, states to which the states associated with the UE_A 10 transition based on the completion of the present procedure are not limited to these states.

The first condition determination may be performed based on identification information, and/or subscriber information, and/or operator policies included in a PDU session establishment request message. For example, in a case that the network accepts the request of the UE_A 10, the first condition determination may be true. In a case that the network does not accept the request of the UE_A 10, the first condition determination may be false. Furthermore, the first condition determination may be true in a case that the network to which the UE_A 10 is connected and/or an apparatus in the network supports functions requested by the UE_A 10, or may be false in a case that the network and/or the apparatus does not support functions requested by the UE_A 10. Note that conditions that true or false of the first condition determination is determined may not be limited to the previously described conditions.

The second condition determination may be performed based on whether a session on the N4 interface for the Pall session has been established. For example, the second condition determination may be true in a case that a session on the N4 interface for the PDU session is established, or may be false in a case of being not established. Note that conditions that true or false of the second condition determination is determined may not be limited to the previously described conditions.

1.4. Description of Procedure Involving Mobility of UE

Figure 18:
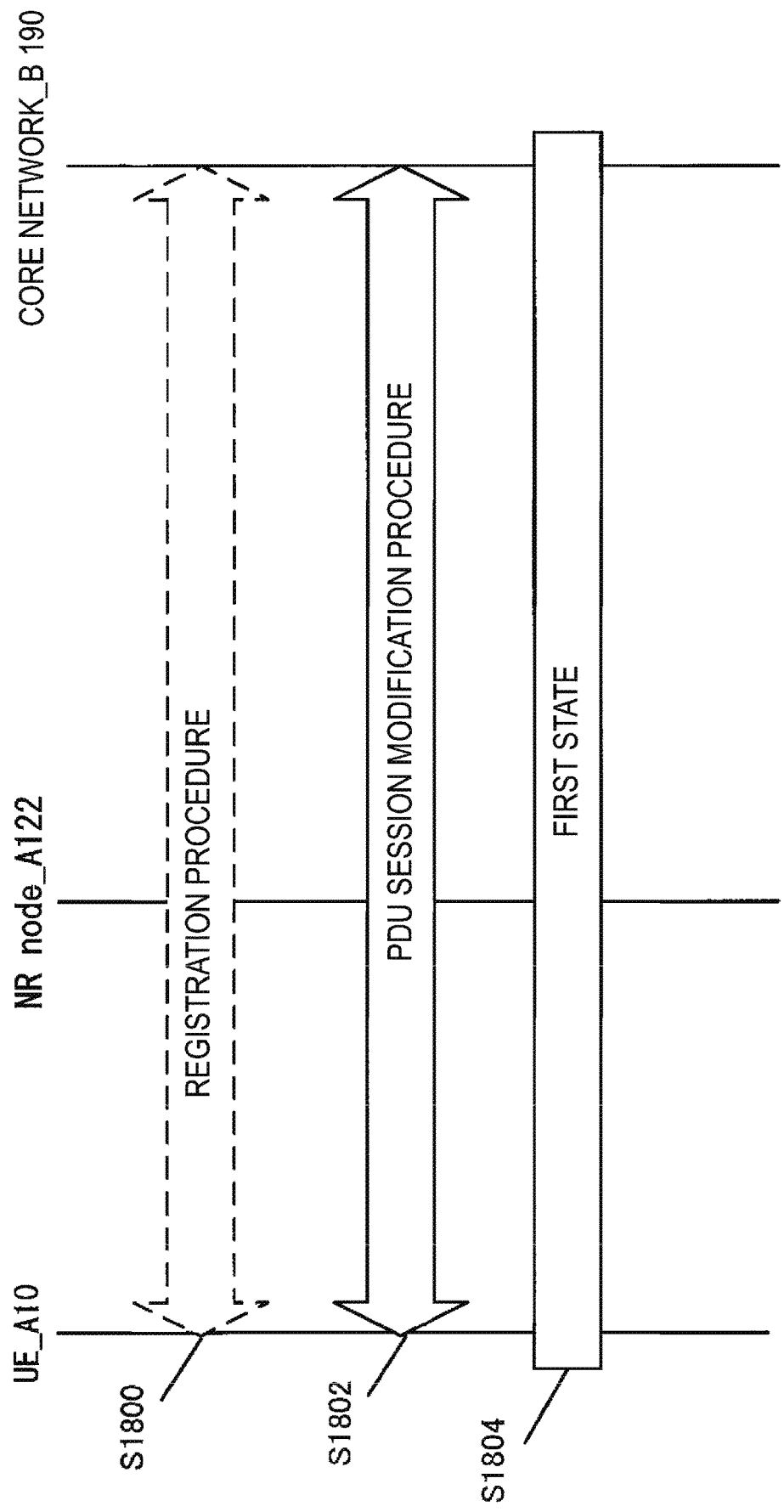
FIG. 18 is a diagram illustrating a procedure associated with the mobility of the UE.

Next, a procedure involving the mobility of a UE will be described with reference to FIG. 18. In the present embodiment, each apparatus transitions to the first state by performing a procedure involving the mobility of a UE. Hereinafter, the present procedure refers to a procedure involving the mobility of a UE, and each procedure includes a registration procedure and a PDU session modification procedure. Details of the Pall session modification procedure will be described below. Note that the registration procedure may be the same procedure as the registration procedure described above.

In the present procedure, each apparatus at first performs a registration procedure (S1800), and the UE_A 10 transitions to a state connected to the network, and/or a state in which position information of the UE_A 10 is updated. Here, the registration procedure may be performed based on the UE_A 10 mobility, and/or may be performed based on UE_A 10 policies and/or subscriber information and/or changes in the UE_A 10 state, and/or may be performed based on expiration of the timer. Furthermore, the registration procedure may be initiated at any timing. Note that conditions at which the registration procedure is initiated are not limited to this. Furthermore, the registration procedure may be omitted.

Then, each apparatus performs a PDU session modification procedure (S1802), and transitions to the first state (S1404). Here, the PDU session modification procedure may be performed based on the completion of the registration procedure, may be performed based on an operator policy and/or changes in a state of the network, or may be performed based on a request from the AF on the DN. Furthermore, the PDU session modification procedure may be initiated at any timing, provided that the PDU session is established. Note that conditions for initiating the PDU session modification procedure is not limited to this.

Note that each apparatus may determine the behavior after the registration procedure, depending on the type of the SSC mode allowed for the PDU session established. For example, in a case that SSC mode 3 is allowed for the established PDU session, the network may initiate the PDU session modification procedure after the completion of the registration procedure. Furthermore, in a case that SSC mode 2 is allowed for the established PDU session, the UE_A 10 may initiate the PDU session establishment procedure instead of the PDU session modification procedure after the registration procedure.

By the above-mentioned procedures, each apparatus completes the present procedure. Note that by transmitting and/or receiving each control message described in the present procedure, each apparatus involved in the present procedure may transmit and/or receive one or more pieces of identification information included in each control message, and may store each transmitted and/or received identification information as a context. Furthermore, each apparatus may transition to the first state, based on completion of the present procedure.

1.4.1. Overview of PDU Session Modification Procedure

An overview of a PDU session modification procedure will now be described. As folows, the present procedure refers to a PDU session modification procedure. The present procedure is a procedure for each apparatus to modify a state of a PDU session. Note that each apparatus may perform the present procedure in a state after completing the PDU session establishment procedure, or may perform the present procedure during the PDU session establishment procedure. Each apparatus may initiate the present procedure in the registered state, or may initiate the present procedure at any timing after the PDU session establishment procedure. Each apparatus may update the state of the PDU session, based on completion of the PDU session modification procedure. Furthermore, in a case that each apparatus establishes multiple PDU sessions, each apparatus may update the state of each PDU session by performing the present procedure several times.

1.4.1.1. Example of PDU Session Modification Procedure

Figure 17:
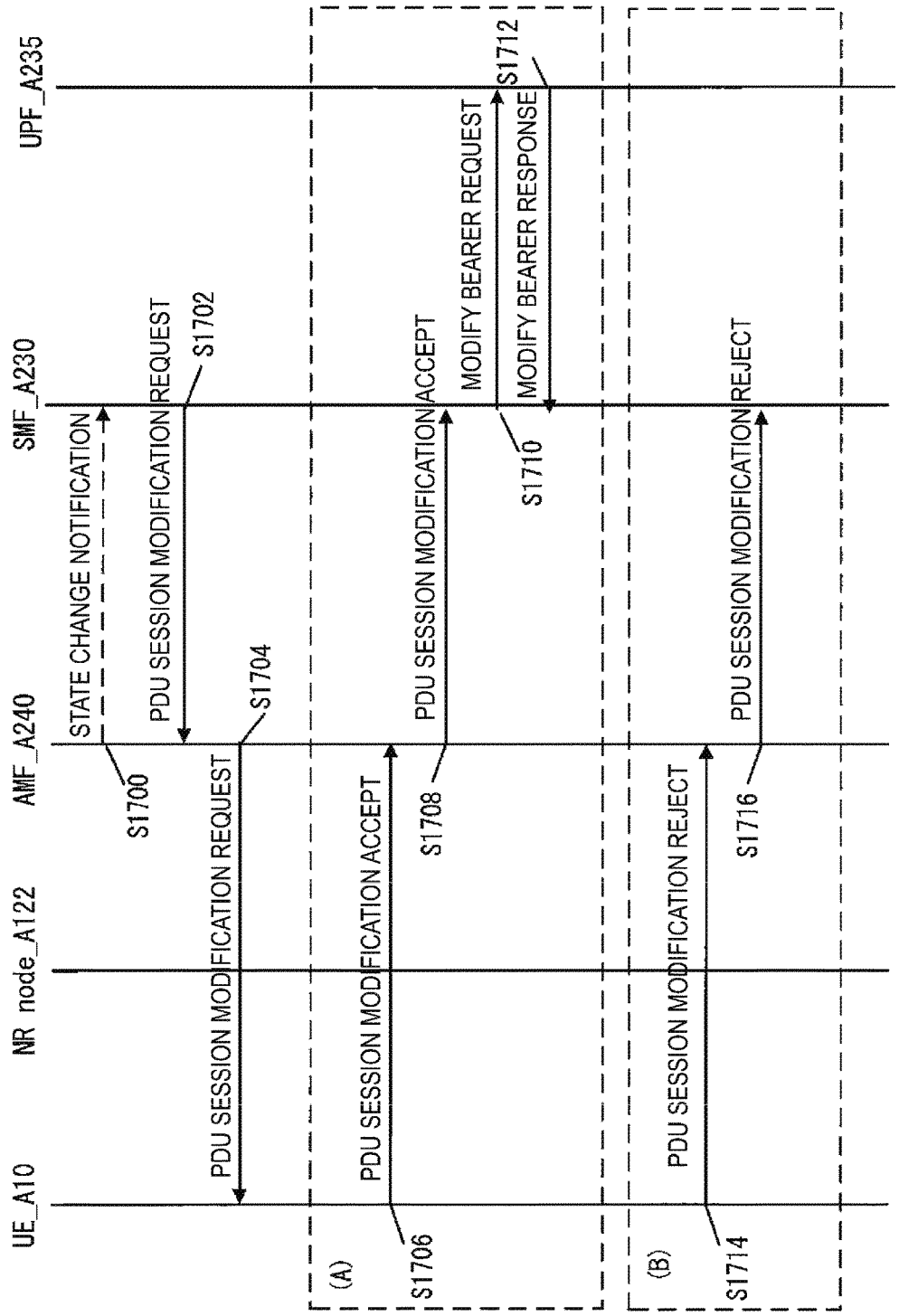
FIG. 17 is a diagram illustrating a PDU session modification procedure.

With reference to FIG. 17, an example of a procedure to perform a PDU session modification procedure will be described. As follows, each step of the present procedure will be described. First, the SMF_A 230 transmits a PDU session modification request message to the UE_A 10 via the AMF_A 240 (S1702) (S1704). Specifically, the SMF_A 230 transmits the PDU session modification request message to the AMF_A 240 by using the N11 interface (S1702), and the AMF_A 240 having received the PDU session establishment request message, transmits the PDU session modification request message to the UE_A 10 by using the N1 interface (S1704).

Note that the trigger for the SMF_A 230 transmitting the PDU session modification request may be reception of a state change notification message transmitted from the AMF_A 240 (S1700), may be reception of a request message from the AF, or may be detection of a change in the state of the SMF_A 230 itself.

Furthermore, the PDU session modification request message may be a NAS message transmitted and/received on the N11 interface and the N1 interface. The PDU session modification request message is not limited to this, and may be a message indicating that establishment of the PDU session has been accepted.

Furthermore, the state change notification message may be a message which the AMF_A 240 transmits to the SMF_A 230 by using the N11 interface, or may be information indicating that the UE_A 10 state has been changed due to the UE_A 10 mobility, or the like. Furthermore, the state change notification message may be information indicating that the state of the UE_A 10 and/or network apparatus has been changed, due to the subscriber information and/or the operator policy and/or the policy of the UE_A 10 has changed. Furthermore, the request message from the AF may be a request message transmitted from the AF, or may be a request message which another network apparatus has transmitted instead.

Here, the SMF_A 230 may include at least one or more pieces of identification information from the 31st identification information to the 35th identification information in the PDU session modification request message and may indicate a request of the SMF_A 230, by including these pieces of identification information.

Furthermore, the SMF_A 230 may request modification of the connection destination of the PDU session, by transmitting one or more pieces of identification information from the 31st identification information to the 35th identification information. More particularly, by transmitting the 32nd identification information and/or associating the 31st identification information and the 32nd identification information to transmit, the SMF_A 230 may request to modify the connection destination of the PDU session to be the second DN, or may further request for the connection destination of the PDU session to be the DN indicated by the 32nd identification information.

Furthermore, by transmitting the 33rd identification information and/or associating the 31st identification information and the 33rd identification information to transmit, the SMF_A 230 may request to modify the connection destination of the PDU session identified by the PDU session ID indicated by the 33rd identification information, or may request for the PDU session connection destination to be the second DN.

Furthermore, by transmitting the 34th identification information and/or associating the 31st identification information and the 34th identification information to transmit, the SMF_A 230 may request to modify the connection destination of the PDU session, or may further request for the PDU session type of the PDU session to be the PDU session type indicated by the 34th identification information.

Furthermore, by transmitting the 34th identification information and/or associating the 31st identification information and the 34th identification information to transmit, the SMF_A 230 may request to make the address used in the user data communication performed on the second DN by using the PDU session to be the address of the type indicated by the 34th identification information, or may further request to make the address used in the user data communication to be the address indicated by the 34th identification information.

Furthermore, by transmitting the 35th identification information and/or associating the 31st identification information and the 35th identification information to transmit, the SMF_A 230 may request to modify the connection destination of the PDU session, or may further request to modify the ITT used in the user data communication performed on the second DN by using the PDU session to be the TFT indicated by the 35th identification information.

Note that the SMF_A 230 may determine which one of the 31st identification information to the 35th identification information to include in the PDU session modification request message, based on network capability information, and/or policies such as operator policy, and/or the network status. Note that the determination by the SMF_A 230 of which identification information is included in the PDU session modification request message is not limited to this.

The UE_A 10 receives the PDU session modification request message, and performs the first condition determination. The first condition determination is intended to determine whether or not the UE_A 10 accepts a request of the network. In the first condition determination, the UE_A 10 determines whether the first condition determination is true or false. The UE_A 10 initiates the procedure of (A) in the present procedure in a case that the first condition determination is true, and initiates the procedure of (B) in the present procedure in a case that the first condition determination is false. Note that steps in a case that the first condition determination is false will be described later.

As follows, steps in a case that the first condition determination is true, in other words, each step of the procedure of (A) in the present procedure will be described. The UE_A 10 transmits a PDU session establishment accept message to the SMF_A 230 through the AMF_A 240 (S1706) (S1708), and initiates the procedure of (A) in the present procedure.

Specifically, the UE_A 10 transmits the PDU session modification accept message to the AMF_A 240 by using the N1 interface (S1706), and the AMF_A 240 having received the PDU session modification request message transmits the PDU session modification accept message to the SMF_A 230 by using the N11 interface (S1708).

Note that the PDU session modification accept message may be a NAS message transmitted and/or received on the N1 interface and the N11 interface. The PDU session modification accept message is not limited to this, and may be a message indicating that establishment of the PDU session has been accepted.

Here, the UE_A 10 may include at least one or more pieces of identification information from the 41st identification information to the 45th identification information in the PDU session modification accept message and may indicate that the request of the network has been accepted, by including these pieces of identification information.

Furthermore, by transmitting one or more pieces of identification information from the 41st identification information to the 45th identification information, the UE_A 10 may indicate that the request to modify the PDU session connection destination has been accepted, or may indicate that the PDU session connection destination is accepted to be modified. More specifically, by transmitting the 42nd identification information and/or by associating the 41st identification information and the 42nd identification information to transmit, the UE_A 10 may indicate that the PDU session connection destination is modified to the second DN, or may indicate that the PDU session connection destination is modified to the DN indicated by the 42nd identification information.

Furthermore, by transmitting the 43rd identification information and/or associating the 41st identification information and the 43rd identification information to transmit, the UE_A 10 may indicate that the connection destination of the PDU session identified by the PDU session ID indicated by the 43rd identification information is modified, or may indicate that the connection destination after modification of the PDU session is the second DN.

Furthermore, by transmitting the 44th identification information and/or associating the 41st identification information and the 44th identification information to transmit, the UE_A 10 may indicate that the connection destination of the PDU session is modified to the second DN, or may indicate that the address used in the user data communication performed for the second DN by using the PDU session is modified to the address of the PDU session type indicated by the 44th identification information and/or the address indicated by the 44th identification information.

Furthermore, by transmitting the 45th identification information and/or associating the 41st identification information and the 45th identification information to transmit, the UE_A 10 may indicate that the PDU session connection destination is modified to the second DN, or may indicate that the TET used in the user data communication performed for the second DN by using the PDU session is modified to the TFT indicated by the 45th identification information.

Note that the UE_A 10 may determine which one of the 41st identification information to the 45th identification information to include in the PDU session modification accept message, based on the received identification information, and/or the UE_A 10 capability information, and/or policy such as the UE policy, and/or the UE_A 10 preferences. Note that the determination by the UE_A 10 of which identification information is included in the PDU session modification accept message is not limited to this.

The SMF_A 230 receives the PDU session modification accept message, and transmits a Session Modification request message to the UE_A 235 (S1710), and further receives a Session Modification response message transmitted by the UPF_A 235 having received the session modification request message (S1712). Each apparatus completes the procedure of (A) in the present procedure, based on transmission and/or reception of the PDU session modification accept message, and/or transmission and/or reception of the session modification response message.

Each step of the procedure of (B) in the present procedure will now be described. The UE_A 10 transmits a PDU session establishment reject message to the SMF_A 230 through the AMF_A 240 (S1714) (S1716), and initiates the procedure of (B) in the present procedure.

Specifically, the UE_A 10 transmits the PDU session modification reject message to the AMF_A 240 by using the N1 interface (S1714), and the AMF_A 240 having received the PDU session modification request message transmits the PDU session modification reject message to the SMF_A 230 by using the N11 interface (S1716).

Note that the PDU session modification reject message may be a NAS message transmitted anchor received on the N11 interface and the N1 interface. The PDU session modification reject message is not limited to this, and may be a message indicating that establishment of the PDU session has been rejected.

Here, the UE_A 10 may include at least one or more pieces of identification information from the 51st identification information to the 56th identification information in the PDU session modification reject message and may indicate that the request of the network has been rejected, by including these pieces of identification information.

Furthermore, by transmitting one or more pieces of identification information from the 51st identification information to the 56th identification information, the UE_A 10 may indicate that the request to modify the PDU session connection destination has been rejected, or may indicate that the PDU session connection destination is not accepted to be modified. Furthermore, the UE_A 10 may transmit one or more pieces of identification information from the 51st identification information to the 56th identification information to indicate that the PDU session connection destination has not been modified to the second DN.

For example, the UE_A 10 may transmit the 51st identification information to indicate that the connection to the second DN is temporarily not possible, or to indicate that the connection to the second DN is not possible in the cell and/or TA to which the UE_A 10 is currently connected.

Furthermore, by transmitting the 52nd identification information, the UE_A 10 may indicate that the DNN indicated by the 32nd identification information is inappropriate in modifying the connection destination of the PDU session, or may indicate that the DNN indicated by the 32nd identification information is not the DNN indicating the second DN.

Furthermore, by transmitting the 53rd identification information, the UE_A 10 may indicate that the PDU session ID indicated by the 33rd identification information is inappropriate in modifying the connection destination of the PDU session, or may indicate that the connection destination of the PDU session identified by the PDU session ID indicated by the 33rd identification information cannot be modified to the second DN.

Furthermore, by transmitting the 54th identification information, the UE_A 10 may indicate that the PDU session type and/or address indicated by the 34th identification information is inappropriate in modifying the connection destination of the PDU session, or may indicate that the address of the PDU session type indicated by the 34th identification information and/or the address indicated by the 34th identification information cannot be used for the user data communication performed on the second DN.

Furthermore, by transmitting the 55th identification information, the UE_A 10 may indicate that the TFT indicated by the 35th identification information is inappropriate in modifying the connection destination of the PDU session, or may indicate that the TFT indicated by the 35th identification information cannot be used for the user data communication performed on the second DN.

Furthermore, the UE_A 10 may indicate that retransmission of the PDU session modification request message of the network is prohibited for a certain period of time, or may indicate a period in which retransmission of the PDU session modification request message is prohibited, by transmitting the 51st identification information and/or the 56th identification information. Furthermore, by transmitting the 56th identification information, the UE_A 10 may indicate initiating the first timer or may indicate that the value indicated by the 56th identification information is configured as the value of the first timer.

Note that the UE_A 10 may determine which one of the 51st identification information to the 56th identification information to include in the PDU session modification reject message, based on the received identification information, and/or network capability information, and/or policies such as operator policy, and/or the network status. Note that the determination by the UE_A 10 of which identification information is included in the PDU session modification reject message is not limited to this.

Each apparatus completes the present procedure, based on completion of the procedures of (A) or (B) of the present procedure. Note that each apparatus may transition to a state where a PDU session has been established, based on completion of the procedure of (A) in the present procedure, may recognize that the present procedure has been rejected, based on completion of the procedure of (B) in the present procedure, or may transition to a state where a PDU session is not established.

Furthermore, each apparatus may perform processes based on identification information transmitted and/or received in the present procedure, based on completion of the present procedure. For example, the UE_A 10 may recognize that the PDU session connection destination is modified, or may recognize that the PDU session connection destination after modification is the second DN, in a case that one or more pieces of identification information from the 31st identification information to the 35th identification information is received and/or one or more pieces of identification information from the 41st identification information to the 45th identification information is transmitted.

Furthermore, the UE_A 10 may recognize that the DN identified by the 32nd identification information and/or the 42nd identification information is the second DN, or may recognize that the PDU session connection destination has been modified to the DN identified by the 32nd identification information and/or the 42nd identification information, based on reception of the 31st identification information and/or the 32nd identification information, and/or transmission of the 41st identification information and/or the 42nd identification information. Furthermore, the UE_A 10 may recognize that the PDU session identified by the 33rd identification information and/or the 43rd identification information becomes a PDU session that can be used in performing the user data communication for the second DN. based on reception of the 31st identification information and/or the 33rd identification information, and/or transmission of the 41st identification information and/or the 43rd identification information.

Furthermore, the UE_A 10 may recognize that the address that can be used in performing the user data communication for the second DN becomes the address of the PDU session type identified by the 34th identification information and/or the 44th identification information, and/or the address identified by the 34th identification information and/or the 44th identification information, based on reception of the 31st identification information and/or the 34th identification information, and/or transmission of the 41st identification information and/or the 44th identification information. Furthermore, the UE_A 10 may recognize that the TFT that can be used in performing the user data communication for the second DN becomes the TFT identified by the 35th identification information and/or the 45th identification information, based on reception of the 31st identification information and/or the 35th identification information, and/or transmission of the 41st identification information and/or the 45th identification information.

Furthermore, the UE_A 10 may use the PDU session identified by the 33rd identification information and/or the 43rd identification information, may use the address of the PDU session type identified by the 34th identification information and/or the 44th identification information, and/or the address identified by the 34th identification information and/or the 44th identification information, or may use the TFT identified by the 35th identification information and/or the 45th identification information, in performing the user data communication for the second DN.

In other words, in a case that the UE_A 10 receives one or more pieces of identification information from the 31st identification information to the 35th identification information, and/or transmits one or more pieces of identification information from the 41st identification information to the 45th identification information, the UE_A 10 may perform the user data communication for the DN identified by the 32nd identification information and/or the 42nd identification information, may perform the user data communication for the second DN by using the PDU session identified by the 33rd identification information and/or the 43rd identification information, may perform the user data communication for the second DN by using the address of the PDU session type identified by the 34th identification information and/or the 44th identification information and/or the address identified by the 34th identification information and/or the 44th identification information, or may perform the user data communication for the second DN by using the TFT identified by the 35th identification information and/or the 45th identification information, after completion of the procedure.

Furthermore, in a case of that the UE_A 10 receives one or more pieces of identification information from the 31st identification information to the 35th identification information, and/or transmits one or more pieces of identification information from the 41st identification information to the 45th identification information, the UE_A 10 may update the information in the context held by the UE_A 10 to information indicated by each piece of identification information received with the PDU session modification request message and/or each piece of identification information transmitted with the PDU session modification accept message. In other words, in a case that the UE_A 10 transmits one or more pieces of identification information from the 51st identification information to the 56th identification information, the UE_A 10 may not update the information in the context held by the UE_A 10 to the information indicated by each piece of identification information received with the PDU session modification request message, or may further store the information indicated by each piece of identification information transmitted with the PDU session modification reject message in the context which the UE_A 10 holds.

Furthermore, the UE_A 10 may transition to the first state, may transition to the state in which the PDU session is established, or may transition to a normal state, based on reception of the PDU session modification request message, and/or transmission of the PDU session modification accept message, and/or reception of each piece of identification information that is included in the PDU session modification request message, and/or transmission of each piece of identification information that is included in the PDU session modification accept message. Note that the normal state may be a state to transition to in a case that the procedure is completed successfully. Furthermore, the normal state may be a state in which the PDU session connecting to the second DN has been established. Note that, states to transition to based on the completion of the present procedure are not limited to these states.

Furthermore, the UE_A 10 may transition to the state in which the PDU session is not established, or may transition to an abnormal state, based on transmission of the PDU session modification reject message, and/or transmission of each piece of identification information that is included in the PDU session modification reject message. Note that the abnormal state may be a state to transition to in a case that the procedure is not completed successfully. Furthermore, the abnormal state may be a state in which the PDU session connected to the second DN is not established, or may be a state in which the PDU session connection destination has not been modified to the second DN. Note that, states to transition to based on the completion of the present procedure are not limited to these states.

Furthermore, the AMF_A 240 and/or the SMF_A 230 may cause the state associated with the UE_A 10 to transition to the first state, the state in which the PDU session is established, or a normal state, based on reception of the PDU session modification accept message, and/or reception of each piece of identification information that is included in the PDU session modification accept message. Note that, states to which the states associated with the UE_A 10 transition based on the completion of the present procedure are not limited to these states.

Furthermore, the AMF_A 240 and/or the SMF_A 230 may transition the state associated with the UE_A 10 to the state in which the PDU session is not established, or may transition to an abnormal state, based on reception of the PDU session modification reject message, and/or reception of each piece of identification information that is included in the PDU session modification reject message. Note that, transition states associated with the UE_A 10 based on the completion of the present procedure is not limited to these states.

The first condition determination may be performed based on identification information included in the PDU session modification request message, and/or the UE_A 10 preferences, and/or the UE_A 10 policy, and/or the context held by the UE_A 10. For example, the first condition determination may be true in a case that the UE_A 10 allows the request of the network. The first condition determination may be false in a case that the UE_A 10 does not allow the request for the network. Furthermore, the first condition determination may be true in a case that the UE_A 10 to which the network is connected and/or an apparatus in the UE_A 10 may support the function requested by the network, and may be false in a case of being not supported. Note that conditions that true or false of the first condition determination is determined may not be limited to the previously described conditions.

2. Modifications

A program running on an apparatus according to the present invention may serve as a program that controls a Central Processing Unit (CPU) and the like to cause a computer to operate in such a manner as to realize the functions of the above-described embodiment according to the present invention. Programs or the information handled by the programs are temporarily stored in a volatile memory, such as a Random Access Memory (RAM), a non-volatile memory, such as a flash memory, a Hard Disk Drive (HDD), or another storage apparatus system.

Note that a program for realizing such functions of the embodiment according to the present invention may be recorded on a computer-readable recording medium. The functions may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining a program for a short time, or any other computer-readable recording medium.

Furthermore, each functional block or various characteristics of the apparatuses used in the above-described embodiment may be implemented or performed in an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or may be a processor of known type, a controller, a micro-controller, or a state machine instead. The above-mentioned electric circuit may be constituted of a digital circuit or an analog circuit. Furthermore, in a case that with advances in semiconductor technology, a circuit integration technology appears that replaces the present integrated circuits, one or multiple aspects of the present invention can also use a new integrated circuit based on the technology.

Note that the present invention of the present patent application is not limited to the above-described embodiment. In the embodiment, apparatuses have been described as an example, but the present invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiment of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

REFERENCE SIGNS LIST

1 Mobile communication system
5 PDN_A
10 UE_A
30 PGW_A
35 SGW_A
40 MME_A
42 SGSN_A
45 eNB_A
46 SCEF_A
50 HSS_A
60 PCRF_A
80 E-UTRAN_A
105 DN_B
120 NextGen RAN_A
122 NR node_A
123 NR node_B
125 WLAN ANc
126 WAG_A
130 UPGW_A
140 CPF_A
190 Core network_B
230 SMF_A
235 UPF_A
240 AMF_A

The invention claimed is:

1. A User Equipment (UE) comprising:
transmission and/or reception circuitry; and
a controller, wherein
the transmission and/or reception circuitry is configured to transmit, to an Access and Mobility Management Function (AMF), a Non-Access-Stratum (NAS) message including a Protocol Data Unit (PDU) Session Establishment Request and a Data Network Name (DNN) corresponding to a Data Network (DN) in a PDU Session Establishment procedure, and
the DNN is a DNN that the UE received from the AMF in a Registration Accept message in a Registration procedure before the PDU Session Establishment procedure, the Registration Accept message being transmitted from the AMF to the UE in response to a Registration Request from the UE to the AMF.

2. The UE according to claim 1, wherein the controller is configured not to establish a PDU Session to the DN in the Registration procedure.

3. The UE according to claim 1, wherein the DN is a Local DN.

4. The UE according to claim 1, wherein the DN is a DN that is accessible by the UE only in specific locations.

5. A communication method performed by a User Equipment (UE), the communication method comprising:
transmitting, to an Access and Mobility Management Function (AMF), a Non-Access-Stratum (NAS) message including a Protocol Data Unit (PDU) Session Establishment Request and a Data Network Name (DNN) corresponding to a Data Network (DN) in a PDU Session Establishment procedure, in order to establish a new PDU Session to the DN, wherein the DNN is a DNN that the UE received from the AMF in a Registration Accept message in a Registration procedure before the PDU Session Establishment procedure, the Registration Accept message being transmitted from the AMF to the UE in response to a Registration Request from the UE to the AMF.

6. The communication method according to claim 5, wherein the UE does not establish a PDU Session to the DN in the Registration procedure.

7. The communication method according to claim 5, wherein the DN is a Local DN.

8. The communication method according to claim 5, wherein the DN is a DN that is accessible by the UE only in specific locations.

9. An Access and Mobility Management Function (AMF) comprising:
- transmission and/or reception circuitry; and
- a controller, wherein
    - the transmission and/or reception circuitry is configured to receive, from a User Equipment (UE), a Non-Access-Stratum (NAS) message including a Protocol Data Unit (PDU) Session Establishment Request and a Data Network Name (DNN) corresponding to a Data Network (DN) in a PDU Session Establishment procedure, and
    - the DNN is a DNN that the AMF transmitted to the UE in a Registration Accept message in a Registration procedure before the PDU Session Establishment procedure, the Registration Accept message being transmitted from the AMF to the UE in response to a Registration Request from the UE to the AMF.

10. The AMF according to claim 9, wherein a PDU Session to the DN is not established in the Registration procedure.

11. The AMF according to claim 9, wherein the DN is a Local DN.

12. The AMF according to claim 9, wherein the DN is a DN that is accessible by the UE only in specific locations.

13. A communication method performed by an Access and Mobility Management Function (AMF), the communication method comprising:
- receiving, from a User Equipment (UE), a Non-Access-Stratum (NAS) message including a Protocol Data Unit (PDU) Session Establishment Request and a Data Network Name (DNN) corresponding to a Data Network (DN) in a PDU Session Establishment procedure, in order to establish a new PDU Session to the DN, wherein
    the DNN is a DNN that the AMF transmitted to the UE in a Registration Accept message in a Registration procedure before the PDU Session Establishment procedure, the Registration Accept message being transmitted from the AMF to the UE in response to a Registration Request from the UE to the AMF.

14. The communication method according to claim 13, wherein a PDU Session to the DN is not established in the Registration procedure.

15. The communication method according to claim 13, wherein the DN is a Local DN.

16. The communication method according to claim 13, wherein the DN is a DN that is accessible by the UE only in specific locations.

* * * * *